US010579627B2

(12) United States Patent
Nevrekar et al.

(10) Patent No.: US 10,579,627 B2
(45) Date of Patent: Mar. 3, 2020

(54) DATABASE OPERATION USING METADATA OF DATA SOURCES

(71) Applicant: Microsoft Technology Licensing, LLC, Redmond, WA (US)

(72) Inventors: Narayan Nevrekar, Bellevue, WA (US); Franciscc Stugren, Seattle, WA (US); Atul Bhartia, Bothell, WA (US); Kevin Joseph Fischer, Redmond, WA (US); Michael Guthrie, Redmond, WA (US); Sohail Mohammed, Redmond, WA (US); Scott Rosemund, Bellevue, WA (US); Kazi Al-Rashid, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 489 days.

(21) Appl. No.: 14/991,388

(22) Filed: Jan. 8, 2016

(65) Prior Publication Data

US 2017/0199875 A1 Jul. 13, 2017

(51) Int. Cl.
*G06F 16/2457* (2019.01)
*G06F 17/24* (2006.01)
(Continued)

(52) U.S. Cl.
CPC .. *G06F 16/24578* (2019.01); *G06F 16/24553* (2019.01); *G06F 16/9032* (2019.01); *G06F 17/248* (2013.01)

(58) Field of Classification Search
CPC ......... G06F 17/30997; G06F 17/30867; G06F 17/3053; G06F 17/30592; G06F 17/30598;
(Continued)

(56) References Cited

U.S. PATENT DOCUMENTS 5,692,175 A 11/1997 Davies et al.
6,370,537 B1 * 4/2002 Gilbert .............. G06F 17/30554
(Continued)

OTHER PUBLICATIONS

Isard et al. Dryad: Distributed Data-Parallel Programs from Sequential Building Blocks, Microsoft Research, 2007, all pages. (Year: 2007).*

(Continued)

*Primary Examiner* — Jay A Morrison
*Assistant Examiner* — Antonio J Caiado
(74) *Attorney, Agent, or Firm* — Arent Fox LLP

(57) ABSTRACT

In some examples, a computing device determines a data manipulation from a job specification. The device determines a corresponding data-processing instruction using data-source metadata, and determines and executes a corresponding query. In some examples, a device receives search keys. The device searches data-source metadata using the search keys. The device weights a first data source based on producer-consumer relationships between data sources, and ranks the first data source using the weight. In some examples, a device determines structural and content information of a data record. The device determines a data-source identifier from the structural information and stores the content information with the data-source identifier in a database. In some examples, via a user interface, a device receives a job specification and annotation data. The device stores the spec and the annotation data in a metadata repository.

15 Claims, 16 Drawing Sheets

(51) Int. Cl.
*G06F 16/2455* (2019.01)
*G06F 16/9032* (2019.01)

(58) Field of Classification Search
CPC ......... G06F 17/30557; G06F 17/30303; G06F 17/30498; G06F 17/30162; G06F 17/3015; G06F 17/30156; G06F 17/30115; G06F 17/248; G06F 17/30554; G06F 17/30967; G06F 9/5038; G06F 9/50; G06F 16/24578; G06F 16/2457; G06F 16/245; G06F 16/9032; G06F 16/903; G06F 16/24553; G06F 16/2455; G06F 16/248; G06F 16/22; G06F 16/21
USPC ........................................................ 707/603
See application file for complete search history.

(56) References Cited

U.S. PATENT DOCUMENTS

| | | | |
|---|---|---|---|
| 6,754,214 B1* | 6/2004 | Mahalingaiah | H04L 45/04 370/392 |
| 7,970,746 B2 | 6/2011 | Seshadri et al. | |
| 8,874,600 B2 | 10/2014 | Gupta et al. | |
| 9,300,554 B1* | 3/2016 | Kosai | G06F 16/24578 |
| 9,405,814 B1* | 8/2016 | Kapoor | G06F 9/451 |
| 9,418,085 B1* | 8/2016 | Shih | G06F 17/30292 |
| 2002/0169789 A1* | 11/2002 | Kutay | G06F 8/34 |
| 2005/0223042 A1 | 10/2005 | Evans et al. | |
| 2005/0228800 A1* | 10/2005 | Dettinger | G06F 17/30917 |
| 2006/0053151 A1* | 3/2006 | Gardner | G06F 17/279 |
| 2007/0055647 A1* | 3/2007 | Mullins | G06F 17/30607 |
| 2007/0061266 A1* | 3/2007 | Moore | G06Q 50/00 705/51 |
| 2007/0192318 A1* | 8/2007 | Ramer | G06F 16/9535 |
| 2007/0198586 A1* | 8/2007 | Hardy | G06F 16/29 |
| 2008/0093468 A1* | 4/2008 | Fan | B42D 15/0073 235/494 |
| 2009/0254572 A1* | 10/2009 | Redlich | G06Q 10/06 |
| 2010/0299372 A1* | 11/2010 | Djugash | G06F 17/30569 707/805 |
| 2011/0004622 A1* | 1/2011 | Marson | G06Q 10/06 707/770 |
| 2011/0137959 A1 | 6/2011 | Kerer et al. | |
| 2013/0132333 A1 | 5/2013 | De Smet et al. | |
| 2013/0190899 A1* | 7/2013 | Slessman | G05B 13/02 700/28 |
| 2013/0198223 A1* | 8/2013 | Ahmed | G06F 17/30371 707/769 |
| 2013/0246401 A1* | 9/2013 | Lawrence | G06F 17/3053 707/722 |
| 2013/0262348 A1 | 10/2013 | Kiran et al. | |
| 2013/0276125 A1* | 10/2013 | Bailey | H04L 63/1433 726/25 |
| 2013/0346422 A1* | 12/2013 | Jordahl | G06F 17/30601 707/748 |
| 2014/0101299 A1 | 4/2014 | Cherel et al. | |
| 2014/0143329 A1* | 5/2014 | Garg | H04L 67/306 709/204 |
| 2014/0156344 A1 | 6/2014 | D'Cruz | |
| 2014/0156634 A1 | 6/2014 | Buchmann et al. | |
| 2014/0164378 A1* | 6/2014 | Levandoski | G06F 16/25 707/737 |
| 2015/0026145 A1* | 1/2015 | Prakash | G06F 17/30401 707/706 |
| 2015/0032730 A1 | 1/2015 | Cialdea, Jr. et al. | |
| 2015/0094990 A1* | 4/2015 | Beisiegel | G06F 17/30598 702/189 |
| 2015/0186553 A1* | 7/2015 | Biehn | G06F 16/283 707/708 |
| 2015/0347193 A1* | 12/2015 | Wolfson | G06F 9/5038 718/103 |
| 2016/0034547 A1* | 2/2016 | Lerios | G06F 17/30563 707/602 |
| 2016/0224676 A1* | 8/2016 | Miller | G06F 17/30365 |
| 2016/0284026 A1* | 9/2016 | Kulkarni | G06Q 40/06 |
| 2016/0328442 A1* | 11/2016 | Waas | G06F 17/3056 |
| 2016/0335350 A1* | 11/2016 | Bawri | H04M 1/274533 |
| 2016/0342811 A1* | 11/2016 | Whitcomb | G06F 21/6245 |
| 2016/0350442 A1* | 12/2016 | Crosby | G06F 17/30309 |
| 2017/0075964 A1* | 3/2017 | Greene | G06F 16/254 |
| 2017/0199875 A1* | 7/2017 | Nevrekar | G06F 17/3053 |
| 2017/0257356 A1* | 9/2017 | Hankins | H04L 63/08 |

OTHER PUBLICATIONS

Hyracks: A Flexible and Extensible Foundation for Data-Intensive Computing, Computer Science Dept. University of California, all pages. (Year: 2011).*

Chaiken et al. SCOPE: Easy and Efficient Parallel Processing of Massive Data Sets, Microsoft, 2008, all pages. (Year: 2008).*

Gedik et al. SPADE: The System S Declarative Stream Processing Engine, IBM Thomas J. Watson, 2008, all pages. (Year: 2008).*

Apache MetaModel, retrieved on Dec. 11, 2015 at <http://metamodel.apache.org>, pp. 1-3 and 7.

Chaiken, et al., "SCOPE: Easy and Efficient Parallel Processing of Massive Data Sets," VLDB, Aug. 24-30, 2008, pp. 1-12.

"Data Factory", Retrieved on: Oct. 28, 2015 from <https://azure.microsoft.com/en-us/services/data-factory/>.

Demirkan, et al., "Leveraging the capabilities of service-oriented decision support systems: Putting analytics and big data in cloud", In Journal of Decision Support Systems, vol. 55, Issue 1, Apr. 2013, 4 pages.

Helland, Pat, "Cosmos: Big Data and Big Challenges," Jul. 2011 pp. 1-27.

Miller, Ron., "Microsoft Announces Public Preview of Azure Data Catalog", Published on: Jul. 10, 2015 Available at: http://techcrunch.com/2015/07/10/microsoft-announces-public-preview-of-azure-data-catalog/.

Pandey, et al., "An autonomic cloud environment for hosting ECG data analysis services", In Journal of Future Generation Computer Systems, vol. 28, Issue 1, Jan. 2012, 3 pages.

Sorenson, Kasper, "Unified Access to all Your Data Points with Apache MetaModel," ApacheMetaModel, pp. 1-42.

TFIDFSimilarity (Lucene 53.1 API), retrieved Dec. 13, 2015 at <http://lucene.apache.org/core/5_3_1/core/org/apache/lucene/search/similarities/TFIDFSimilarity.html>, pp. 1-4.

The Visual Studio Blog, retrieved Dec. 29, 2015 at <http://blogs.msdn.com/b/visiualstudio/archive/2015/09/28/introducing-u-sql.aspx>, Sep. 28, 2015, pp. 1-5.

"Unified Dimensional Model; SQL Server 2005," retrieved on Nov. 8, 2015 at <https://web.archive.org/web/20110502061650/http://technet.microsoft.com/en-us/library/ms174783(v=SQL.90).aspx>, Microsoft: TechNet, pp. 1-10.

"MySQL export into outhle: CSV escaping chars", Retrieved From <<http://web.archive.org/web/20151025010032/http://stackoverflow.com/questions/1119312/mysql-export-into-outfile-csv-escaping-chars>>, Oct. 25, 2015, 3 Pages.

Garcia, et al., "The TSIMMIS Approach to Mediation: Data Models and Languages", In Journal of Intelligent Information Systems, vol. 8, Issue 2, Apr. 1, 1997, pp. 117-132.

Madhavan, et al., "Generic Schema Matching with Cupid", In Proceedings of the International Conference on Very Large Data Bases, Jan. 1, 2001, 10 Pages.

"International Search Report and Written Opinion Issued in PCT Application No. PCT/US2016/069058", dated May 23, 2017, 29 Pages.

Roth, et al., "Don't Scrap It, Wrap It! A Wrapper Architecture for Legacy Data Sources", In Proceedings of the International Conference on Very Large Databases, Aug. 26, 1997, pp. 266-275.

Stonebraker, et al., "Mariposa: a wide-area distributed database system", In International Journal on Very Large Data Bases, vol. 5, Issue 1, Jan. 1, 1996, pp. 48-63.

\* cited by examiner

DATABASE OPERATION USING METADATA OF DATA SOURCES

BACKGROUND

Databases are increasingly being used for complex analytical or data-mining tasks such as pattern extraction and clustering. Many types of databases are in use, including relational database management systems (RDBMSes) such as those accessible using the Structured Query Language (SQL), and non-RDBMS or "NoSQL" databases that store data in non-relational forms, e.g., hierarchically. Moreover, many types of query interfaces are in use, including SQL database clients, statistical programming languages such as R, and online analytical processing (OLAP) client applications. Furthermore, data can now be provided in many forms, including via SQL INSERT statements, hypertext transfer protocol (HTTP) (or secured HTTP, HTTPS, and likewise throughout) POST requests, and syndication reports in the Rich Site Summary (RSS) or Atom formats.

SUMMARY

This disclosure describes systems, methods, computer-readable media holding processor-executable instructions, and user interfaces, for loading data into, searching, and managing databases. In some examples, a computing device determines a data manipulation based at least in part on a job specification, wherein at least one of the data source(s) is associated with the job specification. The computing device determines a data-processing instruction based at least in part on the data manipulation and at least some metadata of the at least one of the data source(s). The computing device determines a query from the data-processing instruction based at least in part on the job specification. The computing device executes the query by accessing data from at least one of the data source(s) based at least in part on the query to provide query results.

In other examples, a computing device receives a search request comprising one or more search keys and indicating a plurality of data sources. The computing device determines a weight of a first data source of the plurality of data sources based at least in part on producer-consumer relationships between at least two data sources of the plurality of the data sources. The computing device searches metadata associated with at least one data source of the plurality of data sources using the search keys to identify matching data sources of the plurality of data sources, wherein the matching data sources correspond to the search request. The computing device determines ranking information of at least the first data source and a second data source of the plurality of the data sources based at least in part on the determined weight.

In still other examples, a computing device receives a data record from a data stream. The computing device determines structural information of the data record and content information of the data record. The computing device determines a data-source identifier based at least in part on the structural information. The computing device stores the content information into a database in association with the data-source identifier.

In yet other examples, a computing device presents a user interface comprising at least one query-criterion control and at least one result-field control. The computing device receives, via the user interface, information of a job specification. The job specification includes a query criterion and a result-field specification. The computing device presents, in the user interface, an annotation control. The computing device receives, via the user interface, annotation data. The computing device stores, in a metadata repository, the information of the job specification in association with the annotation data.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, engine(s), module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
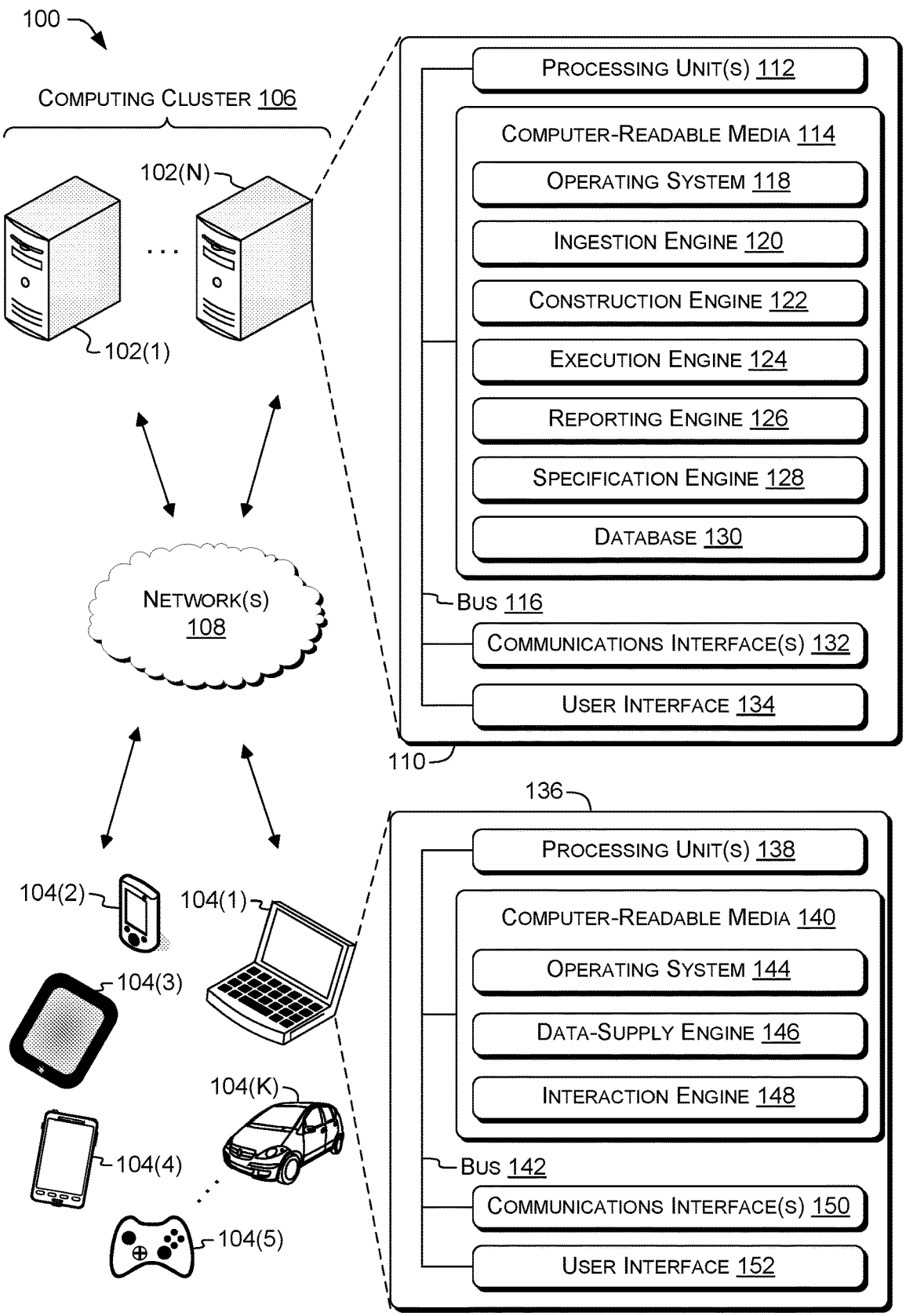
FIG. 1 is a block diagram depicting an example environment for implementing operation of databases as described herein.

Examples described herein provide techniques and constructs to improve the preparation and execution of database operations, e.g., queries against databases aggregating data from multiple data sources. Database operations can include, e.g., at least ingesting, storing, indexing, searching, transforming, aggregating, analyzing, or exporting data, or exporting results of searches, transformations, aggregations, or analyses of data. Some examples receive a job specification, e.g., from a user, and determine a query corresponding to the job specification. The query provided based at least in part on a job specification can abstract the details of the individual data source(s) used by the specified job. Some examples weight data sources in a search so that, e.g., a user can readily locate relevant data sources to be incorporated into a query. Some examples process incoming data records, e.g., streaming data, to store not only the data, but also structural information or other metadata of the data records.

The job specification can describe or otherwise indicate a database operation to be performed, and can additionally indicate at least some parameters of that database operation. An example job specification can specify an ingestion job that retrieves data from a data source. The ingestion job can, e.g., store the retrieved data into a database. The ingestion job can additionally or alternatively index the data and store the index in a database, or store the data in a document store such as a NoSQL datastore that performs indexing of stored data. Indexing the stored data can permit readily performing searches of stored data. Another example job specification can specify a retrieval job that retrieves from the database data records matching selected criteria. Another example job specification can specify an analysis job that processes data in the database, e.g., by summarizing or aggregating the data or performing mathematical operations on the data. Still another example job specification can specify an export job that exports data from the database to another database or another data sink, e.g., a MICROSOFT EXCEL spreadsheet. In some examples, a job specification can specify more than one database operation.

Various examples preparing a query corresponding to a job specification can permit users to formulate complex database operations more quickly as job specifications compared to formulating such operations directly as queries. Various examples preparing a query can permit applying query-plan optimization techniques to reduce the runtime, memory requirements, disk requirements, or network requirements of a job specification. Various examples preparing a query can permit using stored templates to apply efficient query techniques across multiple jobs.

Various examples weighting data sources can permit locating relevant data sources in response to a user query. Some of these examples can reduce the amount of time the user spends locating a data source for a particular job. Some examples weighting data sources can reduce the number of matching data sources a user must consult while formulating a job, permitting reducing the amount of network bandwidth consumed by retrieval of information about data sources while the user formulates the job.

Various examples processing incoming data records can effectively separate incoming records having different fields or structures. Various examples processing incoming data records can reduce the time required to ingest data into a database and provide data more quickly to relevant jobs. Various examples processing incoming data records can store the records in a database in association with metadata rendering records of different types readily accessible to jobs as separate data sources.

Some examples use processing units provisioned as part of a cluster computing systems ("computing cluster" or "cluster") having several discrete computing nodes that work together to accomplish a computing task assigned to the cluster as a whole. Some such systems can have all, or a portion of the cluster deployed in the cloud. Cloud computing allows for computing resources to be provided as services rather than a deliverable product. For example, in a cloud-computing environment, resources such as computing power, software, information, storage, and/or network connectivity are provided (for example, through a rental agreement) over a network, such as the Internet. As used herein, the term "computing" used with reference to computing clusters, nodes, and jobs refers generally to computation, data storage or retrieval, data manipulation, or other programmatically-controlled operations. The term "resource" used with reference to clusters, nodes, and jobs refers generally to any commodity or service provided by the cluster for use by jobs. Resources can include processor cycles, space on disk or other nonvolatile storage, space in random-access memory (RAM) or other volatile storage, network bandwidth (uplink, downlink, or both), prioritized network channels such as those used for communications with quality-of-service (QoS) guarantees, backup tape space or mounting/unmounting services, electrical power, etc.

As used herein, the term "database" refers generically to a data store configured to retain data and permit or execute queries against the retained data. Databases can be stored in volatile or non-volatile storage, or a combination thereof. Databases can include, e.g., at least data warehouses, RDBMSes, NoSQL databases, key-value stores such as the WINDOWS Registry, flat files or collections of flat files, or other data storage, structured or unstructured. In some examples, a database can include one or more tables, arrays, indices, stored procedures, and so forth to enable data access. Example databases useful with various aspects include MICROSOFT AZURE Storage, MICROSOFT AZURE SQL Services, APACHE LUCENE, ELASTIC SEARCH, and MICROSOFT SQL SERVER.

In some examples, a database can include or be associated with metadata, e.g., of data or database structure, database schema(s), or any combination thereof. Metadata of a data source or of a database drawn from the data source can describe, e.g., a location of the data source, such as a network address; connection details used to connect to that data source; or security information, such as access rights or group memberships required to connect to the data source. Metadata of a database structure or schema can describe, e.g., fields in the database, data types of those fields, or relationships between those fields, such as foreign-key relationships in an SQL database.

Various environments, configurations of electronic devices, and methods for preparing and executing database queries, e.g., for data mining applications, are described further with reference to FIGS. 1-14. While many examples described herein relate to servers and other non-consumer electronic devices, other types of electronic devices can be used, e.g., as discussed with reference to FIG. 1.

Illustrative Environment

FIG. 1 shows an example environment 100 in which examples of database systems can operate or in which database operations such as those described herein can be performed. In the illustrated example, the various devices and/or components of environment 100 include computing device(s) 102(1)-102(N) (individually or collectively referred to herein with reference 102), where N is any integer greater than or equal to 1, e.g., distributed computing resource(s), and computing devices 104(1)-104(K) (individually or collectively referred to herein with reference 104), where K is any integer greater than or equal to 1. In some examples, N=K; in other examples, N>K or N<K. Although illustrated as, e.g., desktop computers, laptop computers, tablet computers, or cellular phones, computing device(s) 102 or 104 can include a diverse variety of device categories, classes, or types and are not limited to a particular type of device. In the illustrated example, computing device(s) 102(1)-102(N) can be computing nodes in a computing cluster 106, e.g., a cloud service such as MICROSOFT AZURE. In some examples, cluster 106 provides storage resources such as disk space, or data-analysis or -mining resources services such as CPU cycles or hosted data-analysis or -mining software. In the illustrated example, computing device(s) 104 can be clients of cluster 106, e.g., a cloud-hosted database cluster, and can submit jobs to cluster 106 and/or receive job results from cluster 106. Computing devices 102(1)-102(N) in cluster 106 can, e.g., share resources, balance load, increase performance, or provide fail-over support or redundancy. Computing devices 104 can additionally or alternatively operate in a cluster or grouped configuration.

By way of example and not limitation, computing device(s) 102 or 104 can include, but are not limited to, server computers or blade servers such as Web servers, map/reduce servers or other computation engines, or network-attached-storage units (e.g., 102(1)), laptop computers, thin clients, terminals, or other mobile computers (e.g., 104(1)), wearable computers such as smart watches or biometric or medical sensors, implanted computing devices such as biometric or medical sensors, computer navigation client computing devices, satellite-based navigation system devices including global positioning system (GPS) devices and other satellite-based navigation system devices, personal data assistants (PDAs), and other specialized portable electronic devices (e.g., 104(2)), tablet computers or tablet hybrid computers (e.g., 104(3)), smartphones, mobile phones, mobile phone-tablet hybrid devices, or other telecommunication devices (e.g., 104(4)), portable or console-based gaming devices or other entertainment devices such as network-enabled televisions, set-top boxes, media players, cameras, or personal video recorders (PVRs) (e.g., 104(5), represented graphically as a gamepad), automotive computers such as vehicle control systems, vehicle security systems, or electronic keys for vehicles (e.g., 104(N), represented graphically as an automobile), desktop computers, or integrated components for inclusion in computing devices, appliances, or other computing device(s) configured to participate in or carry out DNN training or operation as described herein, e.g., for forecasting purposes. In some examples, as indicated, computing device(s), e.g., computing devices 102(1) and 102(2), can intercommunicate to participate in or carry out database operations as described herein. For example, computing device 104(1) can be a data source and computing device 102(2) can be a database system, as described below with reference to, e.g., FIGS. 2 and 3.

Different devices or types of computing devices 102 and 104 can have different needs or ways of interacting with cluster 106. For example, computing devices 104 can interact with cluster 106 with discrete request/response communications, e.g., to trigger execution of previously-prepared queries and receive results. Additionally or alternatively, computing devices 104 can be data sources and can interact with cluster 106 with discrete or ongoing transmissions of data to be stored in a database. For example, computing devices 104 can include servers that monitor other computing systems and provide telemetry events to computing devices 104. In some examples, computing devices 104 can execute services, daemons, or other software that provides telemetry events or other periodically- or intermittently-transmitted data records. In some examples, computing devices 104 can include a personal computer running an operating system can also run a telemetry service that provides telemetry information, such as crash reports, about the personal computer. In some examples, a data source in an automobile, e.g., a computing device 104(N), can periodically provide to cluster 106 data of car location and environmental conditions around the car. This can, e.g., provide improved accuracy of weather forecasting by increasing the amount of data available to the forecast model. Various aspects can receive location data and condition data on a single network connection and make available to jobs separate location-data and condition-data data sources. Additionally or alternatively, computing devices 104 can be data sinks and can interact with cluster 106 with discrete or ongoing requests for reports from a database.

In some examples, computing devices 102 or 104 can communicate with each other or with other computing devices via one or more network(s) 108. In some examples, computing devices 102 and 104 can communicate with external devices via network(s) 108. For example, network(s) 108 can include public networks such as the Internet, private networks such as an institutional or personal intranet, or combination(s) of private and public networks. Private networks can include isolated networks not connected with other networks, such as MODBUS, FIELDBUS, or Industrial Ethernet networks used internally to factories for machine automation. Private networks can also include networks connected to the Internet or other public network(s) via network address translation (NAT) devices, firewalls, network intrusion detection systems, or other devices that restrict or control the types of network packets permitted to flow between the private network and the public network(s).

Network(s) 108 can also include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Network(s) 108 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, network(s) 108 can also include a number of devices that facilitate network communications or form a hardware infrastructure for the networks, such as switches, routers, gateways, access points, firewalls, base stations, repeaters, backbone devices, and the like. Network(s) 108 can also include devices that facilitate communications between computing devices 102 or 104 using bus protocols of various topologies, e.g., crossbar switches, INFINIBAND switches, or FIBRE CHANNEL switches or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX, or multiples or combinations thereof.

Different networks have different characteristics, e.g., bandwidth, latency, accessibility (open, announced but secured, or not announced), or coverage area. The type of network 108 used for any given connection between, e.g., a computing device 104 and cluster 106 can be selected based on these characteristics and on the type of interaction. For example, an example data source can be the "firehose" provided by the TWITTER micro-blogging system. The TWITTER firehose is a real-time feed of all messages sent by users via TWITTER. A feed from the TWITTER firehose can be carried via high-bandwidth, low-latency networks. By contrast, low-bandwidth networks can be used to carry data such as measurements from environmental sensors such as temperature sensors. Such sensors can provide infrequent updates, e.g., one value per minute of a gradually changing temperature.

Details of an example computing device 102(N) are illustrated at inset 110. The details of example computing device 102(N) can be representative of others of computing device(s) 102. However, each of the computing device(s) 102 can include additional or alternative hardware and/or software components. Still referring to the example of FIG. 1, computing device 102(2) can include one or more (e.g., at least one, and likewise throughout) processing unit(s) 112 operably connected to one or more computer-readable media 114, e.g., memories, such as via a bus 116, which in some instances can include one or more of a system bus, a data bus, an address bus, a Peripheral Component Interconnect (PCI) Express (PCIe) bus, a PCI bus, a Mini-PCI bus, and any variety of local, peripheral, or independent buses, or any combination thereof. In some examples, plural processing units 112 can exchange data through an internal interface bus (e.g., PCIe), rather than or in addition to network 108. While the processing units 112 are described as residing on the computing device 102(N), in this example, the processing units 112 can also reside on different computing device(s) 102 or 104 in some examples. In some examples, at least two of the processing units 112 can reside on different computing device(s) 102 or 104. In such examples, multiple processing units 112 on the same computing device 102 or 104 can use a bus 116 of the computing device 102 or 104 to exchange data, while processing units 112 on different computing device(s) 102 or 104 can exchange data via network(s) 108.

Computer-readable media described herein, e.g., computer-readable media 114, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 102 or 104.

In contrast to computer storage media, communication media can embody computer-readable instructions, data structures, program modules, or other data in a modulated data signal, such as a carrier wave, or other transmission mechanism. As defined herein, computer storage media does not include communication media.

In some examples, computer-readable media 114 can store instructions executable by the processing unit(s) 112 that, as discussed above, can represent a processing unit incorporated in computing device 102. Computer-readable media 114 can additionally or alternatively store instructions executable by external processing units such as by an external central processing unit (CPU) or external processor of any type discussed herein. In some examples at least one processing unit 112, e.g., a CPU, graphics processing unit (GPU), or hardware logic device, can be incorporated in computing device 102, while in some examples at least one processing unit 112, e.g., one or more of a CPU, GPU, or hardware logic device, can be external to computing device 102.

Computer-readable media 114 can store, for example, computer-executable instructions of an operating system 118, module(s) of an ingestion engine 120, module(s) of a construction engine 122, module(s) of an execution engine 124, module(s) of a reporting engine 126, module(s) of a specification engine 128, and/or other modules, programs, or applications that are loadable and executable by processing unit(s) 112. In some examples not shown, one or more of the processing unit(s) 112 in one of the computing device(s) 102 or 104 can be operably connected to computer-readable media 114 in a different one of the computing device(s) 102 or 104, e.g., via communications interface and network 108. For example, program code to perform steps of flow diagrams herein, e.g., to interact with ingestion engine 120, construction engine 122, execution engine 124, reporting engine 126, or specification engine 128, or program code to carry out operations of data-supply engine 146 or interaction engine 148, can be downloaded from a server, e.g., computing device 102(1), to a client, e.g., computing device 104(K), e.g., via the network 108, and executed by one or more processing unit(s) in computing device 104(K). For example, the computer-executable instructions stored on the computer-readable media 114 can upon execution configure a computer such as a computing device 102 or 104 to perform operations described herein with reference to the operating system 118, the ingestion engine 120, the construction engine 122, the execution engine 124, the reporting engine 126, or the specification engine 128.

Computer-readable media 114 can also store, for example, a database 130. The database 130 can include, e.g., an SQL or NoSQL database, or another type of database such as those described above. The ingestion engine 120 can load data into the database 130 and the execution engine 124 can perform queries against the database 130.

Processing unit(s) 112 can be or include one or more single-core processors, multi-core processors, CPUs, GPUs, GPGPUs, or hardware logic components configured, e.g., via specialized programming from modules or APIs, to perform functions described herein. For example, and without limitation, illustrative types of hardware logic components that can be used in or as processing units 112 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 112 can represent a hybrid device, such as a device from ALTERA or XILINX that includes a CPU core embedded in an FPGA fabric. These or other hardware logic components can operate independently or, in some instances, can be driven by a CPU. In some examples, at least some of computing device(s) 102 or 104 can include a plurality of processing units 112 of multiple types. For example, the processing units 112 in computing device 102(N) can be a combination of one or more GPGPUs and one or more FPGAs. Different processing units 112 can have different execution models, e.g., as is the case for graphics processing units (GPUs) and central processing unit (CPUs).

Computing device 102 can also include one or more communications interfaces 132 connected via the bus 116 to processing units 112 to enable wired or wireless communications between computing device(s) 102 and other networked computing devices 102 or 104 involved in cluster computing, or other computing device(s), over network(s) 108. Such communications interface(s) 132 can include one or more transceiver devices, e.g., network interface controllers (NICs) such as Ethernet NICs or other types of transceiver devices, to send and receive communications over a network. The processing units 112 can exchange data through respective communications interface(s) 132. In some examples, the communications interface 132 can be a PCI Express (PCIe) transceiver, and the network 108 can be a PCIe bus. In some examples, the communications interface 132 can include, but is not limited to, a transceiver for cellular (3G, 4G, or other), WI-FI, Ultra-wideband (UWB), BLUETOOTH, or satellite transmissions. The communications interface 132 can include a wired I/O interface, such as an Ethernet interface, a serial interface, a Universal Serial Bus (USB) interface, an INFINIBAND interface, or other wired interfaces. For simplicity, these and other components are omitted from the illustrated computing device 102(N).

Computer-readable media 114 of the computing device 102 can store an operating system 118. In some examples, operating system 118 is not used (commonly referred to as a "bare metal" configuration). In some examples, operating system 118 can include components that enable or direct the computing device 102 to receive data via various inputs (e.g., user controls, network or communications interfaces, memory devices, or sensors), and process the data using the processing unit(s) 112 to produce output. The operating system 118 can further include one or more components that present the output (e.g., display an image on an electronic display, store data in memory, and/or transmit data to another computing device). Additionally, the operating system 118 can include components that perform various functions generally associated with an operating system, e.g., storage management and internal-device management.

In some examples, computing device 102 can include a user interface (UI) 134, e.g., of operating system 118 or another module or engine, configured to permit a user, e.g., a data analyst or database administrator, to operate the ingestion engine 120, the construction engine 122, the execution engine 124, the reporting engine 126, or the specification engine 128. Some examples of user interface 134 are discussed below.

Details of an example computing device 104(1) are illustrated at inset 136. The details of example computing device 104(1) can be representative of others of computing device(s) 104. However, each of the computing device(s) 104 can include additional or alternative hardware and/or software components. Computing device 104(1) can include one or more processing unit(s) 138 operably connected to one or more computer-readable media 140, e.g., via a bus 142. Some examples of processing unit(s) 138 are discussed above with reference to processing unit(s) 112. Some examples of computer-readable media 140 are discussed above with reference to computer-readable media 114. For example, computer-readable media 140 can include one or more computer storage media. Some examples of bus 142 are discussed above with reference to bus 116.

Computer-readable media 140 can store, for example, computer-executable instructions of an operating system 144, a data-supply engine 146 or module(s) thereof, an interaction engine 148 or module(s) thereof, and/or other modules, programs, or applications that are loadable and executable by processing unit(s) 138. Some examples of operating system 144 are discussed above with reference to operating system 118.

In some examples, the data-supply engine 146 can be configured to provide one or more data records to computing device(s) 102, e.g., via network 108. For example, a data-supply engine 146 in an automotive computing device 104(N) can be configured to operate sensors (not shown) to periodically sample temperature, wind speed and direction, barometric pressure, and GPS location, and to provide the sampled values to computing device(s) 102 in data records.

In some examples, the interaction engine 148 can be configured to communicate with computing device(s) 102 to operate database 130. In some examples, the interaction engine 148 can receive queries via user interface 152 (discussed below) and transmit information of the queries to cluster 106. Some examples are discussed herein with reference to construction engine 204 or execution engine 206. In some examples, the interaction engine 148 can transmit a request to computing device(s) 102 for a report from the database 130, receive a response, and present the response to a user. Some examples are discussed herein with reference to reporting engine 208.

Computing device 104 can also include one or more communications interfaces 150 connected via the bus 142 to processing unit(s) 138 to enable wired or wireless communications between computing device(s) 104 and other networked computing devices 102 or 104 involved in cluster computing, or other computing device(s), over network(s) 108. Some examples are discussed above with reference to communications interface(s) 132.

In some examples, computing device 104 can include a user interface 152. For example, computing device 104(4) can provide user interface 152 to control or otherwise interact with cluster 106 or computing devices 102 therein. For example, processing unit(s) 138 can receive inputs of user actions via user interface 152 and transmit corresponding data via communications interface(s) 150 to computing device(s) 102.

User interfaces 134 or 152 can include one or more output devices configured for communication to a user or to another computing device 102 or 104. Output devices can be integral or peripheral to computing device 102 or 104. Examples of output devices can include a display, a printer, audio speakers, beepers, or other audio output devices, a vibration motor, linear vibrator, or other haptic output device, and the like. User interface 134 or 152 can include one or more input devices, integral or peripheral to computing device 102 or 104. The input devices can be user-operable, or can be configured for input from other computing device 102 or 104. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device such as a touchscreen, a gestural or motion input device such as a depth camera, a grip sensor, an accelerometer, another haptic input, a visual input device such as one or more cameras or image sensors, and the like.

Illustrative Components

Figure 2:
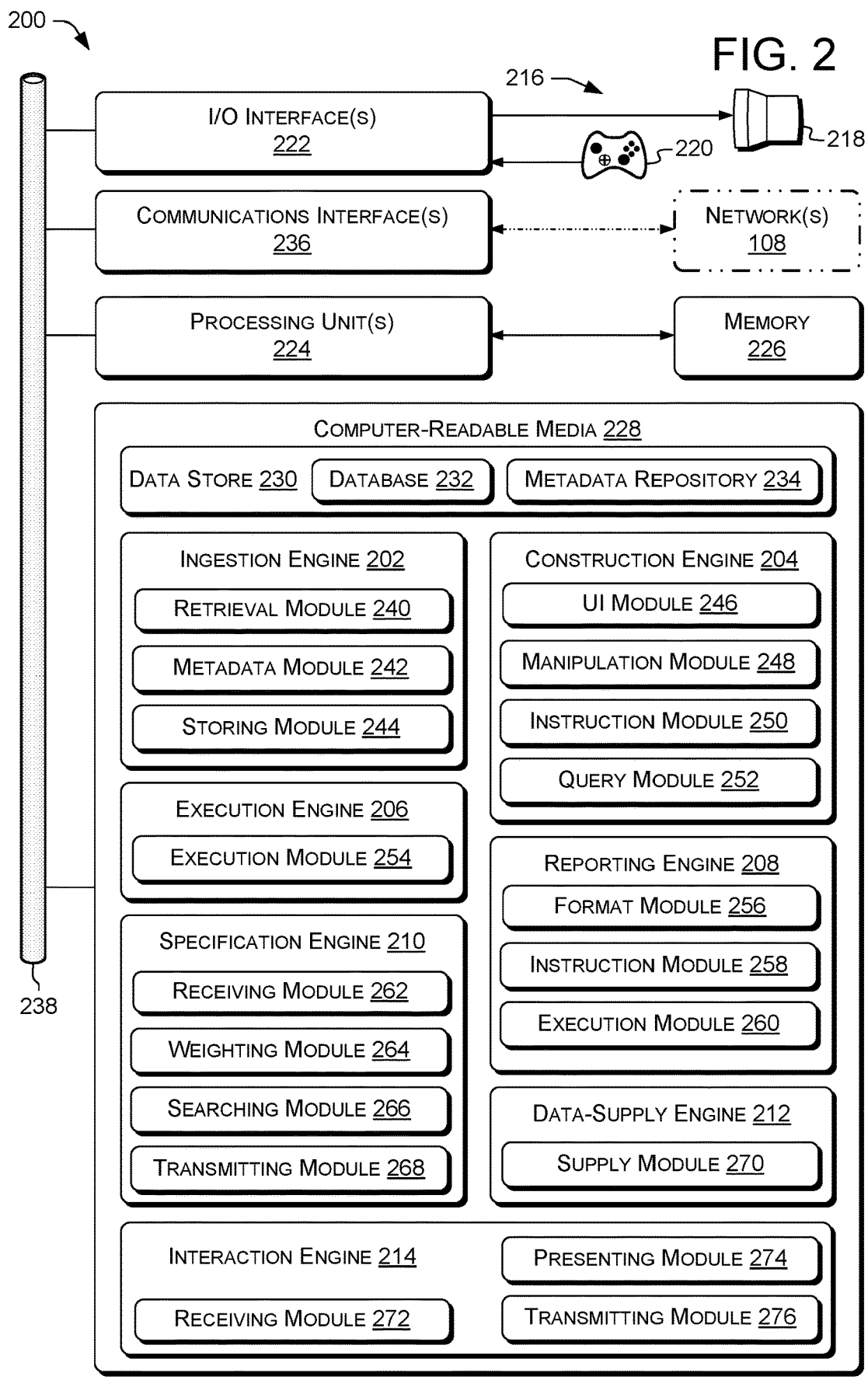
FIG. 2 is a block diagram depicting an example computing device configured to participate in operation of databases according to various examples described herein.

FIG. 2 is an illustrative diagram that shows example components of an computing device 200, which can represent computing device(s) 102 or 104, and which can be, implement, or be included in a database operation system, device, or apparatus, according to various examples described herein. Computing device 200 can implement an ingestion engine 202, which can represent ingestion engine 120, FIG. 1. Computing device 200 can implement a construction engine 204, which can represent construction engine 122, FIG. 1. Computing device 200 can implement an execution engine 206, which can represent execution engine 124, FIG. 1. Computing device 200 can implement a reporting engine 208, which can represent reporting engine 126, FIG. 1. Computing device 200 can implement a specification engine 210, which can represent specification engine 128, FIG. 1. Computing device 200 can implement a data-supply engine 212, which can represent data-supply engine 146, FIG. 1. Computing device 200 can implement an interaction engine 214, which can represent interaction engine 148, FIG. 1. In some examples, e.g., of a computing device 102, computing device 200 can implement at least ingestion engine 202, construction engine 204, execution engine 206, reporting engine 208, or specification engine 210, but not data-supply engine 212 or interaction engine 214. In some examples, e.g., of a computing device 104, computing device 200 can implement at least data-supply engine 212 or interaction engine 214, but not ingestion engine 202, construction engine 204, execution engine 206, reporting engine 208, or specification engine 210.

Computing device 200 can include or be connected to a user interface 216, which can represent user interface 134 or 152. User interface 216 can include a display 218. Display 218 can include an organic light-emitting-diode (OLED) display, a liquid-crystal display (LCD), a cathode-ray tube (CRT), or another type of visual display. Display 218 can be a component of a touchscreen, or can include a touchscreen. User interface 216 can include various types of output devices described above with reference to user interface 134 or 152. In some examples, computing device 200 can be communicatively connected with a user interface 152, FIG. 1, of another computing device. User interface 216 can include a user-operable input device 220 (graphically represented as a gamepad). User-operable input device 220 can include various types of input devices described above with reference to user interface 134 or 152.

Computing device 200 can further include one or more input/output (I/O) interface(s) 222 to allow computing device 200 to communicate with input, output, or I/O devices (for clarity, some not depicted). Examples of such devices can include components of user interface 216 such as user-operable input devices and output devices described above with reference to user interface 134 or 152. Other examples of such devices can include power meters, accelerometers, and other devices for measuring properties of computing device 200 or its environment or of another computing device 102 or 104. Computing device 200 can communicate via I/O interface 222 with suitable devices or using suitable electronic/software interaction methods. Input data, e.g., of user inputs on user-operable input device 220, can be received via I/O interface(s) 222, and output data, e.g., of user interface screens, can be provided via I/O interface(s) 222 to display 218, e.g., for viewing by a user.

The computing device 200 can include one or more processing unit(s) 224, which can represent processing unit(s) 112 or 138. In some examples, processing unit(s) 224 can include or be connected to a memory 226, e.g., a RAM or cache. Processing units 224 can be operably coupled to the I/O interface 222 and to at least one computer-readable media 228, discussed below. Processing unit(s) 224 can be configured to access data from one or more data sources, e.g., databases, via, e.g., I/O interface 222. Processing unit(s) 224 can include, e.g., processing unit types described above with reference to processor 112, such as CPU- or GPGPU-type processing unit(s).

In some examples, computer-readable media 228 of the computing device 200 can represent computer-readable media 114 or 140, FIG. 1, and can store a plurality of modules, e.g., shell modules or API modules, of the ingestion engine 202, the construction engine 204, the execution engine 206, the reporting engine 208, the specification engine 210, the data-supply engine 212, or the interaction engine 214. Processing unit(s) 224 can be configured to execute modules of the plurality of modules. For example, the computer-executable instructions stored on the computer-readable media 228 can upon execution configure a computer such as a computing device 200 to perform operations described herein with reference to the modules of the plurality of modules. The modules stored in the computer-readable media 228 can include instructions that, when executed by the one or more processing units 224, cause the one or more processing units 224 to perform operations described below. In some examples, computer-readable media 228 have thereon computer-executable instructions, e.g., of the modules, the computer-executable instructions upon execution configuring a computer to perform operations described herein. Examples of modules in computer-readable media 228 are discussed below. Computer-readable media 228 can also include an operating system, e.g., operating system 118. Computer-readable media 228 can be computer storage media, as discussed above.

In the illustrated example, computer-readable media 228 includes a data store 230. In some examples, the data store can store database 232, which can represent database 130, FIG. 1. Database 232 can store data records, e.g., including fields (also referred to as "columns"). One or more data records can share a common set of fields. In the illustrated example, data store 230 also stores metadata repository 234. Metadata repository 234 can store, e.g., schema, table names, field names, timing information, or other information about data in database 232. In some examples, metadata repository 234 (or another component of data store 230, and likewise throughout) can store job specifications, e.g., received from users, or information about those job specifications. For example, metadata repository 234 can store information of which data sources are used by which job specifications, or of how many job specifications use data from a particular data source. In some examples, metadata repository 234 can include, e.g., an SQL or other database holding job specifications, and an indexed document store of metadata describing the job specifications or available data sources.

Data store 230 can store data for the operations of processes, applications, components, or modules stored in computer-readable media 228 or computer instructions in those modules executed by processing unit(s) 224, e.g., data, metadata such as database schema, or other data to be used for operation of the database 232. Although shown separately from database 232 for purposes of exposition, metadata repository 234 can be included in database 232, e.g., as an "INFORMATION_SCHEMA" table in a relational database 232 or otherwise visible through a statement such as an SQL DESCRIBE statement or a TRANSACT-SQL "sp_help" statement. In some examples, metadata repository 234 and database 232 can be combined in data store 230.

The computing device 200 can also include a communications interface 236, which can represent communications interface 132 or 150. For example, communications interface 236 can include a transceiver device such as a network interface controller (NIC) to send and receive communications over a network 108 (shown in phantom), e.g., as discussed above. As such, the computing device 200 can have network capabilities. For example, the computing device 200 can exchange data with computing devices 102 or 104 (e.g., laptops, computers, and/or servers) via one or more network(s) 108, such as the Internet. In some examples, the computing device 200 can receive data from one or more data source(s) (not shown) via one or more network(s) 108. Example data source(s) can include computing devices 102 or 104, sensors, data aggregators, or data feeds, e.g., via application programming interfaces (APIs). The processing units 224 can retrieve data from the data source(s), e.g., via an HTTP request such as a GET to a Web Services or Representational State Transfer (REST) API endpoint.

In some examples, the processing unit(s) 224 can access the module(s) on the computer-readable media 228 via a bus 238, which can represent bus 116 or 142, FIG. 1. I/O interface 222 and communications interface 236 can also communicate with processing unit(s) 224 via bus 238.

The modules of the ingestion engine 202 stored on computer-readable media 228 can include one or more modules, illustrated as a retrieval module 240, a metadata module 242, and a storing module 244.

The modules of the construction engine 204 stored on computer-readable media 228 can include one or more modules, illustrated as a user-interface (UI) module 246, a manipulation module 248, an instruction module 250, and a query module 252.

The modules of the execution engine 206 stored on computer-readable media 228 can include one or more modules, illustrated as an execution module 254.

The modules of the reporting engine 208 stored on computer-readable media 228 can include one or more modules, illustrated as a format module 256, an instruction module 258, and an execution module 260.

The modules of the specification engine 210 stored on computer-readable media 228 can include one or more modules, illustrated as a receiving module 262, a weighting module 264, a searching module 266, and a transmitting module 268.

The modules of the data-supply engine 212 stored on computer-readable media 228 can include one or more modules, illustrated as a supply module 270.

The modules of the interaction engine 214 stored on computer-readable media 228 can include one or more modules, illustrated as a receiving module 272, a presenting module 274, and a transmitting module 276.

In the ingestion engine 202, the construction engine 204, the execution engine 206, the reporting engine 208, the data-supply engine 212, or the interaction engine 214, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, the UI module 246 and the receiving module 262 can be combined in a single module that performs at least some of the example functions described below of those modules. In some examples, the UI module 246 can be located in the specification engine 210, or the receiving module 262 can be located in the construction engine 204. In some examples, any or all of the manipulation module 248, the instruction module 250, and the query module 252 can be combined into one or two modules. For example, the instruction module 250 and the query module 252 can be combined into a single module. In some examples, any or all of the execution module 254, the format module 256, the instruction module 258, and the execution module 260 can be combined into one, two, or three modules. In some examples, computer-readable media 228 can include a subset of modules 240-276. Examples of functions performed by modules stored in computer-readable media 228 are discussed below, e.g., with reference to FIGS. 3-14.

Figure 3:
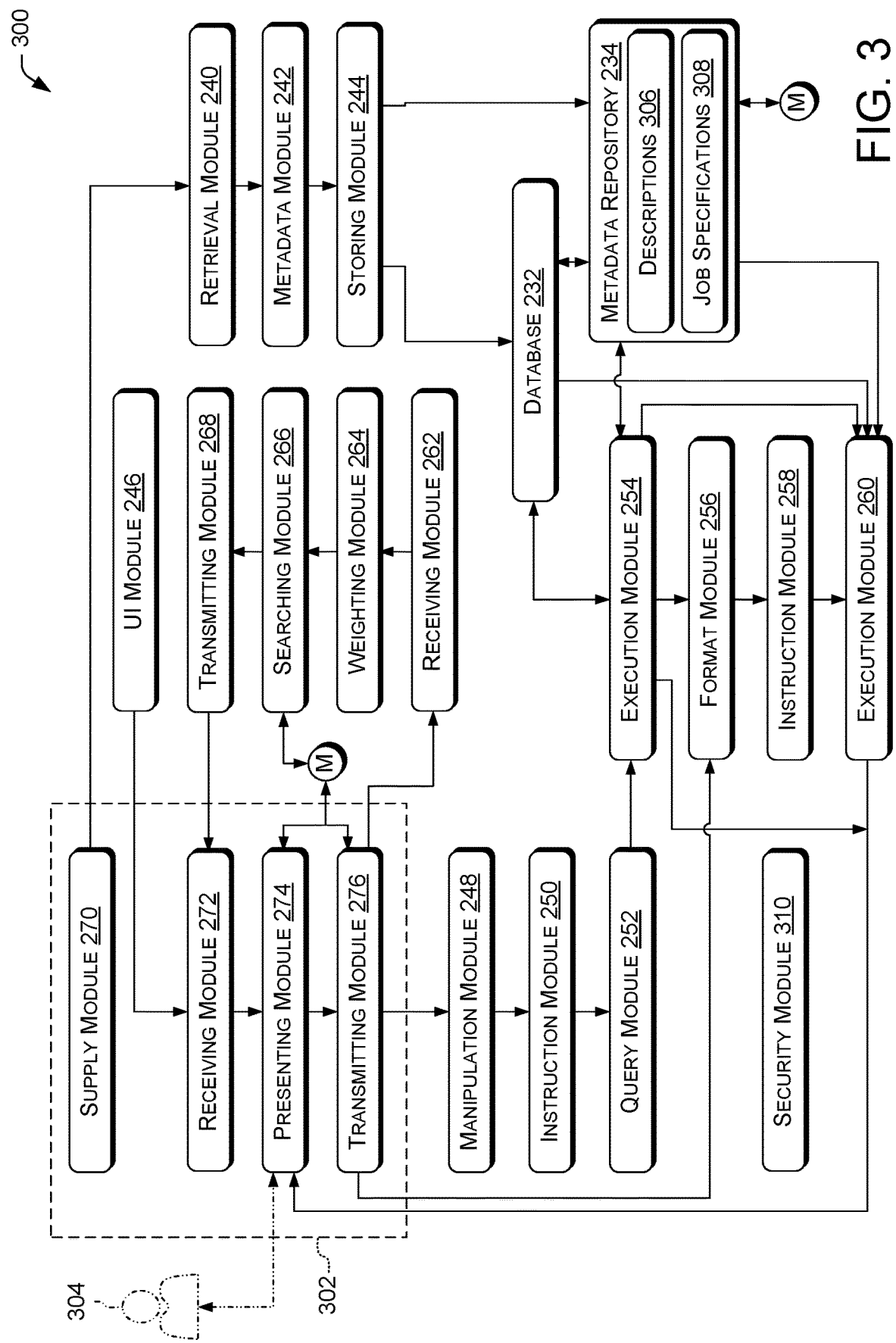
FIG. 3 is a dataflow diagram depicting example module interactions during operation of a database.

FIG. 3 is a dataflow diagram 300 illustrating example interactions between the modules illustrated in FIG. 2. Database client 302 can include a device, e.g., a computing device such as computing device 104, FIG. 1. Database client 302 can be operated by an entity 304 such as a user (shown in phantom).

Throughout this discussion, various operations are described as being performed on various items. Any of the described operations can be performed on other items in addition to any specifically-identified items or other items in any group of items. For example, some configurations herein include determining data manipulations and determining data-processing instructions for the data manipulations. Data-processing instructions can be determined for all, or fewer than all, of the data manipulations. Other example configurations herein include receiving a search request indicating one or more data sources, and determining weights of the data sources. The weights can be determined for all of the indicated data sources or for only some of the indicated data sources. These examples are not limiting.

In some examples, the supply module 270 can be configured to provide data to be stored in the database 232. The supply module 270 can provide data via push or pull techniques, as discussed below with reference to retrieval module 240. The supply module 270 can provide data via network 108 or another connection.

In some examples, the retrieval module 240 can retrieve one or more data records, e.g., from the supply module 270. For example, the data record can be received from a data stream, e.g., provided by a computing device 104. For purposes of clarity, some discussion herein is in the context of a single data stream corresponding to a single data source. However, this is not limiting. The retrieval module 240 can receive data records from one or more data stream(s), in series, in parallel, or alternating in any order. Each data stream can provide data records corresponding to one or more data source(s), e.g., as described below.

Example data streams can include established connections such as the TWITTER firehose, periodically- or intermittently-updated data streams such as RSS feeds, MICROSOFT Component Object Model (COM) storages or streams, running log files (e.g., "tail-f" output on a POSIX-compliant system), HTTP connections, e.g., according to the Asynchronous JAVASCRIPT (JS) and XML (AJAX) or Comet architectural patterns, emails received at a designated address, or USB, BLUETOOTH, PCI, or other connections, wired or wireless, to devices that provide data, e.g., sensors. In some examples, the retrieval module 240 can retrieve one or more data records from database 232 or another database, e.g., as results of a query against that database. For example, the data records can be or include rows returned by an SQL query against a database.

Each data stream or data source can provide one or more records of data. As used herein, the term "record" does not require any fixed format, length, or commonality of structure within or between data domains. For example, each message sent via the TWITTER microblogging service or another similar service can be represented as a single record in a dataset of microblogging messages, even though messages can vary in length and content (e.g., by containing images, text, or links). In another example of a fulltext search engine for books, each book can be represented as a single record having fields for, e.g., title, author, and contents.

In some examples, each data record can be associated with a timestamp. Retrieval module 240 can track the timestamp of the data record most recently processed in a particular run, e.g., of a data-loading job. On the next run of the data-loading job, retrieval module 240 can retrieve only data records newer than the tracked timestamp, then update the timestamp. This can protect against adding duplicate records to the database. Other examples of timestamp-tracking are described with reference to instruction module 258.

In some examples, the metadata module 242 can be configured to determine metadata corresponding to the one or more data records. In some examples, the metadata can include, for a given data record, a data-source identifier indicating one of the data sources for that data record. The metadata can include any number of data-source identifiers for respective data records. For example, in a system with three data sources, the metadata for a data record can include a numeric data-source identifier having a value of 1, 2, or 3 to indicate which of the three data sources provided that record. In examples of data records resulting from a database query results, the data-source identifier can include the name of the query, the name(s) of table(s) on which the query results were based, or the name of a stored procedure that runs the query. If the query is part of a job, the data-source identifier can include the job name.

In some examples, the metadata module 242 can determine which data source is associated with a data record based on information of or provided via the connection over which the data record is received. For example, a data record received from an open connection to the TWITTER firehose can be associated with a data-source identifier of "TWITTER firehose." In other examples, a data record can be received from a telemetry connection, e.g., monitoring events on a computing device 104. The telemetry data record can be associated with a data-source identifier of "telemetry." In other examples, a data record can be retrieved via a connection to a specified database, e.g., a computer-configuration database such as a database of software installed on various computers. The configuration data record can be associated with a data-source identifier of "configuration."

In some examples, data records, e.g., telemetry records, from multiple computing devices 104 can be received via a single connection, e.g., via the output of a syslog program or other event aggregator. In some of these examples, a data record can have a data-source identifier indicating the computing device 104 from which the telemetry data record was received. For example, the data-source identifier can include an integer n for data records received from computing device 104(n). In some examples, the data source for a telemetry record can be indicated by an identification value associated with the computing device 104, e.g., a hostname such as "104.example.com," or a Universally Unique Identifier (UUID) such as {b74202c0-a278-11e5-a430-0002a5d5c51b}.

In some examples, a single computing device 104 can execute multiple supply modules 270, or a computing device 104, data stream, or event aggregator can provide data records of multiple, different types. In some of these examples, the data-source identifier for a data record can include an identifier of the type of the data record or of the particular supply module 270 that provided the data record. In an example, Windows Error Reporting data records can have a data-source identifier of "crash-report" (a type) or "Dr. Watson" (a supply). In another example, Windows Improvement Program records can have a data-source identifier of "usage-statistics" (a type) or "improvement-program" (a supply). In yet another example, an XBOX console or XBOX online service (or other social-media service) can provide events indicating that a user has added a new friend connection or that a user has updated that user's profile. Friend-added data records can have a data-source identifier of "xbox-friend" and profile-updated data records can have a data-source identifier of "xbox-profile-update."

In some examples, the retrieval module 240 can request the data record from the data stream. This can be used with "pull" data streams such as RSS feeds or Win32 message queues (pulled by GetMessage( ) calls in an event loop). In some examples, the request can request specific data record(s), or the R most recent records, R≥1, or records matching specific criteria. In some examples, the retrieval module 240 (or the operating system 118) can establish a network connection with the data stream, e.g., by accepting an incoming network connection from the data stream, and the retrieval module 240 can receive the data record via the network connection. This can be used with "push" data streams such as Comet-styled connections or keyboard input streams in a console. The network connection can persist or can be periodically re-established so that the retrieval module 240 can receive new data when they become available, e.g., as discussed below with reference to execution module 260.

In some examples, the metadata module 242 can determine structural information of the data record and content information of the data record. For example, in a data record stored in or provided from an SQL table, the metadata module 242 can retrieve structural information such as the names and types of the fields in the record from the INFORMATION_SCHEMA of the SQL database, using an SQL DESCRIBE statement, or using database-vendor-specific extensions. The metadata module 242 can determine the content information as the provided values, e.g., in response to an SQL SELECT statement.

In another example, in a JAVASCRIPT Object Notation (JSON)-formatted data record, the metadata module 242 can extract the attribute names and nesting relationships as structural information, and the data values as content information. The metadata module, in this and other examples, can to determine the metadata by extracting attribute values or relationships from the data. An example is shown in Table 1.

TABLE 1

| JSON | Attribute | Value or (comment) |
| --- | --- | --- |
| { | | (A group of the following) |
| artist: "Mike Oldfield", | artist | Mike Oldfield |
| rating: 11, | rating | 11 |
| albums:[ | albums | (An array of the following) |
| { | | |
| name: "Tubular Bells", | name | Tubular Bells |
| year: 1973 | year | 1973 |
| }, { | | |
| name: "Amarok", | name | Amarok |
| year: 1990 | year | 1990 |
| }] | | (ends the array) |
| } | | (ends the group) |

In Table 1, the structural information can include, e.g., a field list with entries "artist," "rating," "albums[0].name" (for "Tubular Bells"), "albums[0].year," "albums[1].name," and "albums[1].year" (for 1990). The content information can include the corresponding values shown in Table 1.

In some examples, the metadata module 242 can extract structural information and content information from other data formats. For example, from an XML data record, XML node names and relationships, e.g., expressed in XPath, can be extracted as structural information, and attribute values and node values can be extracted as content information. In an XML version of Table 1, for example, the structural information could include XPath values of, e.g., "/artist" or "/albums[0]/name." In another examples, from a data record stored in the Resource Interchange File Format (RIFF) or other chunk-based formats such as the Portable Network Graphics (PNG) format, the metadata module 242 can extract chunk names and nesting information as structural information, and chunk contents as content information. For a flat file (e.g., TSV or CSV), or another file not including record-type information, the metadata module 242 can count fields, e.g., based on delimiters such as commas, and infer data types based on observed values in the data. For example, if the values of a particular field in multiple data records match the regular expressions/[0-9]/ and /\b[0-9]*(\.[0-9]*)?([Ee]-?[0-9]+)?\b/, the metadata module 242 can determine that that field, for those records, is a numeric-valued field. In another example, if the values of a particular field in multiple data records match Unicode Transformation Format-8 (UTF-8) text characters, the metadata module 242 can determine that that field, for those records, is a text-valued field having a UTF-8 encoding.

In some examples, such as the example of Table 1, the metadata module 242 can parse the received data record to locate one or more field names, e.g., the JSON attributes or XML node names or attribute names. The metadata module 242 can further parse the received data record to locate one or more field relationships in the received data record. Example field relationships can include nesting relationships, e.g., a "name" field nested in an album that is nested in an "albums" field, or cross-references, e.g., using hash references such as "#target" in the hypertext markup language (HTML) fragment '<a name="target"></a><a href="#target">link text</a>'. Example field relationships between two fields can include parent (e.g., one field is a parent of the other in a hierarchy), child, sibling, grandparent, grandchild, descendent, ancestor, $n^{th}$ child (for nonnegative integer n), or $n^{th}$ sibling. The metadata module 242 can then assemble the field names and the field relationships to provide the structural information, e.g., by listing the field names in a canonical order determined by the field relationships, or by expressing the field names in a fully-qualified form (e.g., "albums[0].name" rather than merely "name").

In some examples, the metadata module 242 can determine the data-source identifier based at least in part on the structural information. For example, the data-source identifier can arrange the structural information in a predetermined format and hash the arranged structural information (e.g., using an MD- or SHA-series hash function), or otherwise provide an identifier associated with the structural information.

In some examples, some data records can have some fields in common and some different fields. For example, telemetry data records from a particular computing device 104 can have some common fields, such as a timestamp and an identifier of the particular computing device 104, and some non-common fields, such as usage statistics for an improvement-program data record and stack-trace data for a crash report. In another example, XBOX friend-added data records and XBOX profile-updated data records can share common fields indicating that the data records are XBOX records, and can have respective, different fields, e.g., a "which friend" field and a "which content" field, respectively. The metadata module 242 can determine the data-source identifier based on at least the common fields or the non-common fields. In some examples, the metadata module 242 can determine multiple data-source identifiers for a particular data record, e.g., one data-source identifier based at least in part on the common fields and another data-source identifier based at least in part on the non-common fields.

In some examples, the metadata module 242 can determine whether the structural information is represented in metadata repository 234. For example, the metadata module 242 can query metadata repository 234 for the data-source identifier corresponding to the structural information. In some examples, the identifier associated with the structural information can be used as a search key for the query. If the structural information is missing from the metadata repository, e.g., as indicated by absence of the search key, the metadata module 242 can add the structural information to the metadata repository and receiving a data-source identifier corresponding to the structural information from the metadata repository 234. In some examples, the determining representation, adding structural information, and receiving the data-source identifier can be performed, e.g., in response to a "conditional add" or similar API call from database client 302.

In some examples, the storing module 244 can store the metadata in a metadata repository 234 associated with the selected one of the data sources. In some examples, the storing module 244 can store the metadata corresponding to a data record in the metadata repository 234 in association with the data-source identifier(s) for data source(s) corresponding to that data record. For example, the storing module 244 can store the structural information and the data-source identifier in a record in the metadata repository 234. Storing the metadata in the metadata repository 234 can permit more readily searching and filtering data records based on record type, data source, or other metadata values. In some examples, the storing module 244 can store the content information into database 232 in association with the data-source identifier. This can permit readily filtering by data source, and can permit readily locating metadata corresponding to the stored content information.

In the illustrated example, metadata repository 234 stores descriptions 306. The descriptions 306 can include metadata of one or more data sources or job specifications, as described herein. For example, the descriptions 306 can include JSON records stored in an indexed data store such as an ELASTIC SEARCH data store. The JSON (or other-format) records can include, e.g., information about a data source such as name, area, type, source component, description, attributes, lineage, relationships with other data sources, or taxonomic or ontological information such as a category or subcategory. Examples of metadata fields are described herein.

Processing described above for retrieval module 240, metadata module 242, or storing module 244 can be performed for a plurality of data records. In some examples, the retrieval module 240 can receive a plurality of data records from the data stream. The metadata module 242 can determine respective structural information records for individual data records of the plurality of data records, one of the respective structural information records including the structural information. The metadata module 242 can further determine one or more representative structural information records of the respective structural information records, each representative structural information record associated with a respective data-source identifier and corresponding to one or more of the individual data records. The storing module 244 can store the individual data records into the database in association with the data-source identifiers of the corresponding representative structural information records. This can permit loading multiple data records, possibly from multiple, different data sources, into database 232 or metadata repository 234 in a way that permits rapid searching and filtering of data records, and that permits effectively performing queries across data records from multiple data sources.

In some examples, the storing module 244 can overwrite data in database 232 or metadata repository 234 with new data retrieved from a data source. This can permit reloading reference data or infrequently-modified data. In some examples, e.g., as described above with reference to the retrieval module 240, the storing module 244 can track a last-record timestamp and store, on a given job run, only data records newer than the last-record timestamp. In some examples, the storing module 244 can merge data in database 232 or metadata repository 234 with new data retrieved from a data source, e.g., by inserting new data records or deleting or modifying existing data records (e.g., with SQL UPDATE statements), to synchronize relevant portions of database 232 or metadata repository 234 with newly-received data records. Data sources can transmit updates instead of full data records, reducing the bandwidth required to maintain current information in database 232 or metadata repository 234.

Data in database 232 or metadata in metadata repository 234 can be queried, e.g., for data mining or business intelligence purposes. Some examples permit a user to more quickly develop efficient queries corresponding to jobs the user wishes to run, e.g., for data retrieval or analysis.

In some examples, the UI module 246 can be configured to provide a user interface comprising a data-source selection control, a query-criterion control, and a result-field control. An example user interface is shown below in FIG. 6. The user interface can be provided, e.g., as one or more HTML or JS files of a Web application. Alternatively, the user interface can be provided as a native application, e.g., a Win32, MICROSOFT .NET, or JAVA application. The UI module 246 can provide the user interface by triggering display on the database client 302 of a UI application stored on database client 302. In some examples, the database client 302 can display the user interface independently of UI module 246, e.g., upon request of a user such as entity 304.

In some examples, the receiving module 272 can receive the user interface or trigger for the user interface, e.g., via network 108.

In some examples, the presenting module 274 can present the user interface. For example, the presenting module 274 can display the user interface on display 218 and receive inputs from entity 304, e.g., a user, via user-operable input device 220. In some examples, the presenting module 274 can run an event loop or terminal dialog, or otherwise operate the user interface to receive user input or present information as described herein.

The user interface can include, e.g., one or more query-criterion controls and one or more result-field controls. The query-criterion controls can receive values used to select relevant data records, as discussed below. The result-field controls can receive values used to select which data is output, also as discussed below. The query-criterion controls, result-field controls, and any other controls of or in the user interface, can include at least text entry controls, labels, checkboxes, radio buttons, pushbuttons, dropdowns (restricted or not) or other list-choice fields, sliders, spinners, or other widgets, whether virtual (e.g., presented on display 218) or physical (e.g., mechanically-actuated pushbuttons).

In some examples, the presenting module 274 can receive user inputs via the user interface. For example, the presenting module 274 can receive, via the user interface, information of a job specification. The job specification can include at least one query criterion, e.g., received via the query-criterion controls, and at least one result-field specification, e.g., received via the result-field controls.

In some examples, the presenting module 274 can further present, in the user interface, annotation control(s). The annotation control(s) can include at least checkbox(es), tag entry control(s), or text entry control(s). The presenting module 274 can receive, via the annotation control(s) of the user interface, annotation data. The annotation data can indicate, e.g., notes, statements of intended use or of limitations, search keywords (e.g., keywords not found in other fields), identification information of related jobs, or other information about the job specification, e.g., information that entity 304 believes would be useful for locating the job specification in a search of data sources.

In some examples, the transmitting module 276 can store, in metadata repository 234, the information of the job specification in association with the annotation data. For example, the transmitting module 276 can receive the information of the job specification and the annotation data from the presenting module 274 and transmit the same to metadata repository 234. In some examples, the transmitting module 276 can reformat or encapsulate the information of the job specification or the annotation data for storage in the metadata repository 234, e.g. by wrapping metadata in XML or by preparing an SQL INSERT query to store the metadata.

In the illustrated example, metadata repository 234 stores job specifications 308. Job specifications received from the transmitting module 276 can be stored, e.g., in a SQL database or other data store. Examples of job specifications are described herein. In some examples, the transmitting module 276 can store in the metadata repository 234 both a job specification 308 and a description 306 of the output of the job indicated in the job specification. This can permit the output of the job to be used as a data source for other jobs, e.g., as described herein.

In some examples, the annotation data can indicate information about data sources or targets of the job. The transmitting module 276 can store, in metadata repository 234, the information of the data source or target in association with the annotation data. This can permit users to more readily locate data sources or targets, reducing the probability of duplication of effort or of storage.

In some examples, the presenting module 274 or the user interface are configured to provide assistance in locating data sources of interest. Various examples herein can reduce the time required for users to locate relevant data sources. Example user interfaces are described herein with reference to FIGS. 6, 15, and 16.

In some examples, the presenting module 274 is configured to present, in the user interface, data-source search control(s). The data-source search control(s) can include at least text-entry control(s) or selection control(s). For example, the text-entry control(s) can receive search keywords. The selection control(s) can receive selections from predetermined option sets and can include, e.g., checkboxes, radio buttons, or drop-down lists (single- or multi-select, e.g., multi-select with checkboxes per item). In some examples, a text-entry control can be combined with a selection control to provide autocompletion or otherwise permit a user to use at least some textual input to select from an option set. In some examples, an option set can be prepared from metadata such as descriptions 306. For example, the presenting module 274 or another module can determine an option set including the data-source types of data sources listed in metadata repository 234. This can be done, e.g., using a "select unique values" query. The presenting module 274 or another module can associate the determined option set with a selection control to permit the user to select option(s) from the option set.

In some examples, selection control(s) can permit selecting at least a name of a data source, e.g., a data-source identifier or human-provided friendly name, a type of data source (e.g., SQL databases or RSS feeds), or a category, subcategory, area, provider, or location of the data source. Categories and subcategories can be examples of taxonomic or ontological metadata; other taxonomic or ontological metadata, such as term relationships or group membership, can additionally or alternatively be selected via selection control(s). Types, categories, subcategories, areas, providers, locations, or other distinguishing field values of data sources can have hierarchical levels or values. For example, data sources originating from Otsuki, Yamanashi Prefecture, Japan, can have location values of "Japan," "Japan.Yamanashi," or "Japan.Yamanashi.Otsuki." Example categories can include at least "devices" or "users." Example subcategories of a "devices" category can include at least "telemetry" or "improvement program." Example providers can include the names of organizations or sub-organizations, such as business units, that provide the data. Example areas can include "collection" (data still being collected), "staging" (data received but still being processed), or "processed" (data ready for use). Example locations can include physical or logical server locations, e.g., within a particular cluster 106 or outside that cluster 106.

In some examples, the presenting module 274 is configured to receive, via the user interface, one or more search keys. The search keys can include values entered in any of the data-source search control(s), e.g., full-text keywords or category selections. Individual search keys can be required, optional, or prohibited, indicating that data sources must, may, or must not match those individual search keys, respectively. For example, the search keys may indicate that a data source must have category "music," may have full-text "Mike Oldfield", may have full-text "Pink Floyd," and must not have full-text "bad." Such a query can be expressed in APACHE LUCENE classic query syntax as '+category: music "Mike Oldfield" "Pink Floyd"-bad'. The user interface can permit entity 304 to provide this query, e.g., using a single text control in which the LUCENE query is entered, or using, e.g., a dropdown for category, a fulltext control for words or phrases that may be included ("Mike Oldfield" and "Pink Floyd"), and a separate fulltext control for words or phrases that must not be included ("bad").

In some examples, the presenting module 274 is configured to search the metadata repository 234 (e.g., the descriptions 306) for data sources matching the search keys to provide matching data sources. The searching can be performed once all search keys have been provided, e.g., after press of a "Search" button, or iteratively, e.g., when values entered in the data-source search control(s) change. In some examples, the searching can include at least searching stored annotation data, e.g., provided via the annotation control(s). In some examples, the metadata repository can be searched, e.g., using Boolean or full-text searching. In some examples, the metadata repository can be searched as discussed below with reference to receiving module 262, weighting module 264, searching module 266, and transmitting module 268.

For example, when an entity 304, e.g., a user, creates a data source, the entity 304 can provide annotations indicating, e.g., keywords, scope, intended use, or other features of the data source. In some examples, as discussed below, the results of a query can themselves be used as a new data source. The annotations can include, e.g., information about the query. Receiving, storing, and searching annotations can provide more rapid discovery of relevant data sources. In some examples, when a data source is created, metadata associated with that data source can be automatically produced, e.g., by the presenting module 274. The automatically-produced metadata can include, e.g., tags expressing or indicating connections between data sources such as producer-consumer relationships, or indications of search terms or criteria used while building the query. In some examples, the annotations or other metadata (user-provided or automatically produced) of a data source, e.g., a job, can include an indication of a typical frequency of update of the data source (e.g., how often the job is scheduled to run).

Metadata of a data source can include can include metadata of the data source or of individual fields provided by the data source. Field-specific metadata can include, e.g., free text fields configured to hold human-readable explanations of the contents of a field. Metadata can include predetermined types of values for each field, e.g., a data type of the field such as text or number, a flag indicating whether data records must include a value for that field, a default value of the field if the field is optional, or values useful for tracking business requirements. In some examples, user interfaces such as those described herein can permit supplying values for field-specific metadata instead of or in addition to values for job-specific metadata.

In some examples, the presenting module 274 is configured to present, in the user interface, identification information of the matching data sources. For example, the presenting module 274 can present a list of data sources after press of a Search button, or iteratively. The identification information can include at least data source names, data-source identifiers, or other metadata about the data sources.

As noted above, query results can serve as data sources for future jobs. In some examples, therefore, the matching data sources include a job specification. In some examples, the presenting module 274 is configured to, after presenting the identification information, receive, via the user interface, a second job specification including a designation of the job specification as a data source.

Some examples provide query support, e.g., running on a computing device 102, to effectively rank relevant data sources higher in the search results.

In some examples, the receiving module 262 can receive information provided at least partly via the user interface. The information can include, e.g., a job specification or a search request. In some examples, the transmitting module 276, e.g., executing on a computing device 104, can transmit the information, e.g., in key-value, JSON, or XML form, to the receiving module 262, e.g., executing on a computing device 102. For example, the transmitting module 276 can package the search keys from presenting module 274 in, e.g., an XML, JSON, multipart/form-data, or application/x-www-form-urlencoded form, and transmit the packaged data to receiving module 262 via an HTTP connection.

In some examples, therefore, the receiving module 262 can receive a search request comprising one or more search keys, e.g., received via data-source search control(s). The search request can indicate one or more data sources, e.g., a plurality of data sources. In some examples, the search request can indicate specific data sources or groups, categories, catalogs, or other arrangements of data sources to be searched. In some examples, the search request can be transmitted via a channel indicating to the receiving module 262 which data sources should be searched. In some examples, the search request can be transmitted as a query, e.g., in LUCENE syntax or another query syntax, and the receiving module 262 can parse the query to extract the search keys, e.g., using a regular-language parser such as an LL(k) or LR(k) parser (e.g., with k=1).

In some examples, the weighting module 264 can determine respective weights of ones of the data sources, e.g., two or more of the data sources, based at least in part on producer-consumer relationships between ones of the plurality of the data sources. For example, the weighting module 264 can determine a weight of a first data source of the plurality of data sources based at least in part on producer-consumer relationships between at least two data sources of the plurality of the data sources. A particular data source can be considered a "producer" if data from that data source is used by one or more "consumer" jobs stored in the metadata repository 234. In some examples, the weight for a data source being searched (e.g., those indicated in or by the search request as noted above) can be the count of consumers of that data source, the count normalized to a reference value (e.g., 1.0), or the count normalized by a Softmax or other ramp function. In some examples, the weight for a particular data source can be based at least in part on the weights of other data sources the particular data source consumes. In some examples, the weighting module 264 can determine the weight of a data source based on consumption information of the data source. The consumption information can include data of the number of jobs, users, or other downstream dependencies accessing or otherwise using data provided by the data source.

Specifically, in some examples, the weighting module 264 can, for a first data source of the data sources, determine, based at least in part on the metadata of the data sources, a number of consumers of the first data source; and determine the respective weight for the first data source based at least in part on, and mathematically positively correlated with, the number of consumers. In some examples, the determined weight of a data source can be a function of the count (or other values noted above), e.g., a monotonically increasing or nondecreasing function. Such functions can include, e.g., monotonically increasing or nondecreasing polynomials, exponentials, or logarithms.

In some examples, the weighting module 264 can determine the weight based on an indication in the metadata of which metadata should be used. For example, the metadata for a data source can indicate that the weight of that data source should be determined based at least in part on at least (i) the number of job specifications 308 referencing that data source as an input; (ii) a downstream click stream count associated with the data source; or (iii) whether annotation data is associated with the data source. In some examples, the weighting module 264 can determine the weight based on an indication in the metadata or in user profile data of which metadata should be used. For example, a particular data source can be weighted based on consumption information for a first user, and weighted based on annotation data for a second, different user. This can provide users with metadata-search results more relevant to the needs of those particular users, permitting users to more rapidly locate relevant data sources.

In some examples, the searching module 266 can search metadata of the data sources using the search keys and the determined weights to identify matching ones of the data sources corresponding to the search request. In some examples, the searching module 266 can search the metadata associated with at least one data source of the plurality of data sources using the search keys to identify matching data sources of the plurality of data sources. The matching data sources can correspond to the search request. In some examples, the data sources can be indexed with a search engine such as APACHE LUCENE, ELASTIC SEARCH, or BING. The indexing can be performed based on at least data records, data-source metadata, or determined weights. The searching module 266 can provide the search keys and the determined weights to the search engine. The search engine can then provide identification of the matching ones of the data sources, e.g., sorted in relevance order based at least in part on the determined weights.

In some examples, the searching module 266 can apply any Boolean conditions in the search keys to the data sources or metadata thereof. For example, a search key indicating category "music" can correspond to a Boolean query (expressed in SQL, in this example) of "CATEGORY='music'" or "CATEGORY LIKE '% music %'". This can permit rapidly filtering out data sources that do not match the indicated category, area, location, or other selections.

In some examples, the searching module 266 can apply full-text search techniques in the search keys to the data sources or metadata thereof, e.g., to the data sources matching any Boolean conditions or metadata of those data sources. The searching module 266 can use at least algorithms for substring matching, regular-expression matching, fuzzy matching, proximity searching, or lookup in or retrieval from B-trees, tries, inverted indices, or other index structures.

Accordingly, in some examples, the searching module 266 can filter the metadata of the data sources based at least in part on at least a type of data source, e.g., using Boolean criteria as noted above, to identify candidate ones of the data sources. The searching module 266 can select the matching ones of the data sources from the candidate ones of the data sources based at least in part on at least some of the search keys.

In some examples, the searching module 266 can rank data sources, e.g., data sources that match the search keys (for brevity, "matches"). For example, the searching module 266 can determine scores for matches using at least algorithms for term frequency (TF), inverse document frequency (IDF), TF-IDF, or Okapi BM25 ranking. The searching module 266 can then rank the matches, e.g., in decreasing or increasing order of score. In some examples, the score can be a sum, weighted sum, saturating sum, product, weighted product, or saturating product of term-specific scores corresponding to the search keys. In some examples, the searching module 266 can determine ranking information of at least the first data source (for which a weight was determined) and a second data source of the plurality of the data sources based at least in part on the determined weight.

In some examples, the searching module 266 can boost the rankings of matching data sources, e.g., based on document boosts, field boosts, or term boosts. In some examples, data sources are considered "documents" from the standpoint of a fulltext search engine. In some examples, individual data sources can be assigned document boosts equal to, positively correlated with, or based at least in part on the respective determined weights of those data sources. For example, if data source "A" has twice as many consumers as data source "B," data source "A" can be given a document boost of 2.0 and data source "B" can be given a document boost of 1.0. In another example, the document boost can be determined as or correlated with the relative weight, with data sources having weights near the average weight across all data sources being given document boosts near 1.0.

In some examples, instead of or in addition to a document boost, field boosts, e.g., computed as described above for document boosts, can be added to fulltext search fields, category fields, or other fields used to match the search keys. For example, the term-specific score for a particular search key can be boosted by the field boost for the field in which the search key occurs in a particular data source's metadata. In some examples, individual search keys can be given term boosts. For example, the term-specific score for a particular search key can be boosted by the term boost for that search key. Boosting by field can permit determining more relevant results using information provided by users of the database, e.g., using annotations as described herein (by boosting the annotation field). Boosting by term can permit users to readily determine relevant results in a search involving a large number of terms.

In some examples, the searching module 266 can retrieve information on boosts or other adjustments to document relevancy, e.g., from a stored profile of entity 304, or from metadata repository 234. This can permit individual entities 304, or individual data-source owners or publishers, to adjust term relevancy to provide users with improved search results, reducing the time required for users to find relevant data sources.

In some examples, the searching module 266 can determine ranking information of at least two of the matching data sources. Ranking information of matches can be determined based at least in part on the determined weight. For example, the matches can be ranked in decreasing or increasing order of their weights. In some examples, a score of one of the matches can be boosted by a weight, e.g., by adding the weight to the score or multiplying the weight with the score. The matches can be ranked in decreasing or increasing order of boosted weights. Boosting can be applied, e.g., at least per data source, per field, or per term, as discussed above.

In some examples, the transmitting module 268 can transmit identification information and ranking information of the matching ones of the data sources, or can transmit transmitting identification information of the matching data sources, and determined ranking information. For example, the transmitting module 268 can provide XML, JSON, HTML, or other-format data of at least some the matching ones of the data sources, e.g., the top S data sources, to database client 302 (in some examples, S=5, or 10, or an integer greater than 1, or the number of matching ones of the data sources). In some examples, the transmitting module 268 can provide the identification information records sorted, e.g., in descending order of ranking, in which case the ranking information can be implicit in the provided order rather than explicitly included. In some examples, the transmitting module 268 can provide the identification information records associated with numbered ranks (e.g., 1st, 2nd, . . . ) or ranking scores (e.g., 3.14159 ranks higher than 2.71828). In some examples, the transmitting module 268 can transmit ranking information for data sources of the matching data sources or of other data sources.

In some examples, the searching module 266 or the transmitting module 268 can group at least some of the matching ones of the data sources based at least in part on at least types or sources of the at least some of the matching ones of the data sources to provide grouping information. For example, individual matching data sources can be associated with category identifiers. In some examples, the searching module 266 or the transmitting module 268 can group at least some of the matching ones of the data sources, e.g., by values of category, area, or another metadata field. This can permit users to readily locate data sources even when the user does not know which category, area, or other value the data source of interest is associated with.

In some examples, the transmitting module 268 can transmit the grouping information in association with the identification information and the ranking information. The receiving module 272 or the presenting module 274 can then present the matching data sources associated with the grouping information, e.g., by presenting the matching data sources divided by group or labeled with their groups. A particular matching data source can be a member of one or more groups. In some examples, the transmitting module 268 can transmit at least one of the above-identified transmittable items, e.g., grouping information, ranking information, or identification information. The transmitting module 268 can additionally or alternatively transmit metadata of any transmittable items, e.g., consumer counts associated with the identified matching ones of the data sources.

In some examples, the receiving module 272 of the database client 302 can receive the identification information and ranking information of the matching ones of the data sources from the transmitting module 268. The receiving module 272 can provide at least some of the received identification or ranking information to the presenting module 274, which can present the results to the entity 304, e.g., in the form of a Web page or a search-results list such as a list box permitting selection of one or more of its entries.

In an example, the transmitting module 276 of the database client 302 can provide an AJAX query including search keys to the receiving module 262 of the specification engine 210, FIG. 2, via an HTTP request. The weighting module 264 and the searching module 266 can locate matching ones of the data sources as described above. The transmitting module 268 of the specification engine 210 can provide the identification information and ranking information to the receiving module 272 of the database client 302, e.g., via an HTTP response to the HTTP request. The presenting module 274 can then update a form, div, or other element of a Web page to show at least some of the relevant data sources. Searching with weights as described herein can permit users to readily locate data sources of interest, and to effectively filter full-text search results to locate relevant data sources.

Data in database 232 or metadata in metadata repository 234 can be queried, e.g., for data mining or business intelligence purposes. For example, one or more data sources identified using a search, e.g., as described above, can be queried. Modules of the construction engine 204, FIG. 2, can prepare a query from a job specification.

Manipulation module 248 can operate on a job specification. In some examples, transmitting module 276 of the database client 302 can transmit the job specification to the manipulation module 248, e.g., in the form of an HTTP GET or POST request. One or more of the data sources can be associated with the job specification. For example, the job specification can indicate ones of the data sources selected, e.g., by entity 304, from search results received as described above. Additionally or alternatively, the job specification can indicate ones of the data sources selected without a search process as described above, e.g., as directed by stored configuration data or direct user entry. The job specification can include data-source identifiers or other identification information of associated ones of the data sources. One or more of the associated ones of the data sources can provide data for the job.

In some examples, a security module 310, e.g., stored on computer-readable media 228 can store information about, or affect, the operation of one or more of the illustrated modules or other modules stored on computer-readable media 228. For example, security module 310 can implement authentication or authorization techniques such as Kerberos or MICROSOFT domain authentication. Security module 310 can limit access to inputs, outputs, or function of one or more of the illustrated modules, e.g., based at least in part on user credentials. Security module 310 can perform auditing, e.g., to store information about user accesses to data or modules. Functions of security module 310 can be performed in cooperation with, or exclusively by, security blocks within one or more of the illustrated modules. Performing authentication, authorization, and auditing can improve robustness of the database and can reduce the computational and database load of producing reports required by governance authorities or procedures.

Figure 4:
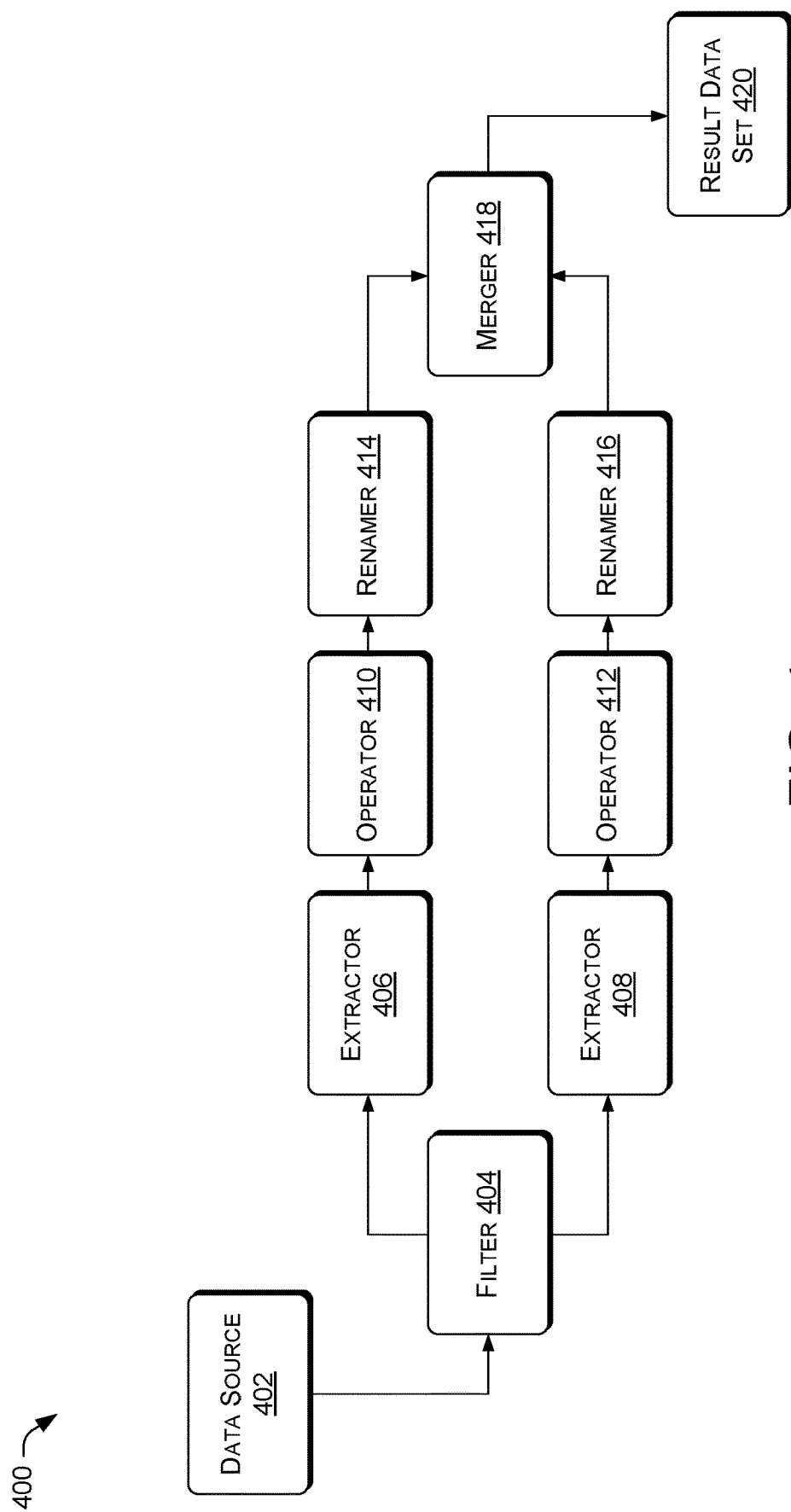
FIG. 4 shows an example dataflow graph of a database operation.

FIG. 4 shows an example dataflow graph 400 of a job specification. The dataflow graph corresponds to the example job specification in Table 2. The example job specification is in a nested form that can be expressed, e.g., in XML with a suitable schema.

TABLE 2

| Line | Specification |
| --- | --- |
| 1 | Name: OrdersByDay |
| 2 | Select from data source: OrderPlaced |
| 3 |     Condition: PRODUCT="WINDOWS 10" |
| 4 | First result field: |
| 5 |     Select field from data source: OrderTime |
| 6 |     Rename to: "Date" |
| 7 |     Apply function: RoundToDay |
| 8 | Second result field: |
| 9 |     Select field from data source: ComputerID |

TABLE 2-continued

| Line | Specification |
| --- | --- |
| 10 |     Rename to: "OrderCount" |
| 11 |     Apply function: CountDistinctValues |

In Table 2, Line 1 provides a name for the job ("OrdersByDay"). This name can later be used to refer to the outputs of the job as a data source for other jobs. In FIG. 4, data source 402 (line 2), e.g., an "OrderPlaced" table in an RDBMS, provides data records to filter 404 (line 3). Filter 404 passes records for which the "PRODUCT" field has the value "WINDOWS 10" to extractors 406 and 408. Extractor 406 (line 5) extracts the "OrderTime" fields from records provided by filter 404. Operator 410 (line 7) applies the "RoundToDay" function to values from extractor 406 to change a timestamp, e.g., 2015-03-14T9:26:53.5, to a date, e.g., 2015-03-14. Extractor 408 (line 9) extracts the "ComputerID" fields from records provided by filter 404. Operator 412 (line 11) applies the "CountDistinctValues" function to disregard duplicate orders from the same computer, which may arise, e.g., in case of network service interruptions to an online ordering process. Renamer 414 (line 6) renames the results from operator 410 to "Date." Renamer 416 (line 10) renames the results from operator 412 to "OrderCount." Merger 418 provides result data set 420 including one or more data record(s), each having a "Date" value from renamer 414 and an "OrderCount" value from renamer 416. The following discussion is with reference to FIGS. 3 and 4.

In some examples, manipulation module 248, FIG. 3, can determine one or more data manipulations based at least in part on the job specification. For example, manipulation module 248 can determine a dataflow graph such as dataflow graph 400, e.g., a tree or directed acyclic graph (DAG), corresponding to the job specification. Individual nodes of the dataflow graph can represent individual data manipulations. In some examples, the data manipulations (e.g., the dataflow graph) can be expressed in terms of, or represent, an intermediate representation of the job. The intermediate representation can be independent of a specific query language or language(s), e.g., SQL or U-SQL.

Example data manipulations can include at least manipulations shown in Table 2 and FIG. 4, e.g., at least acquiring data from a data source, filtering that data, extracting fields from the data, applying functions to field values, aggregating field values, making comparisons between values of fields within or between data records, comparing field values to constants or to variables held fixed during running of the job, renaming fields, merging fields to provide new data records, or other operations, e.g., expressible in query languages such as SQL, U-SQL, APACHE PIG, or APACHE HIVE.

In some examples, manipulation module 248 can include a parser, interpreter, or compiler that operates on the job specification to produce the dataflow graph. For example, the job specification can conform to a predefined LR(1) language (or LL(1), or another regular language, context-free language, or context-sensitive language), and manipulation module 248 can execute an LR(1) (or other) parser with the job specification as input to produce the dataflow graph in the form of an abstract syntax tree of the job specification. In some examples, the job specification can conform to a fixed pattern, e.g., the values entered via controls in a fixed user interface such as UI 600, FIG. 6. The manipulation module 248 can retrieve a stored dataflow graph corresponding to the UI and populate values in the graph with values from the job specification (e.g., provided via the UI), or values determined based at least in part on values in the job specification.

In some examples, instruction module 250 can determine, for individual ones of the data manipulations, one or more data-processing instructions based at least in part on metadata of individual ones of the data sources associated with the job specification. In some examples, instruction module 250 can determine a data-processing instruction based at least in part on at least one data manipulation and at least some metadata of the at least one of the data source(s). For example, instruction module 250 can determine, for individual data manipulations (e.g., individual nodes of dataflow graph), expressions or statements in a query language such as SQL or U-SQL that, when executed, will carry out the functions of those data manipulations.

In some examples, instruction module 250 can determine a plurality of data manipulations, the plurality of data manipulations including the data manipulation, and determine a plurality of data-processing instructions based at least in part on respective data manipulations of the plurality of data manipulations, the plurality of data-processing instructions including the data-processing instruction. This can permit processing queries involving more than one data manipulation.

In some examples, instruction module 250 can provide a plurality of data-processing instructions for a single data manipulation, or for a defined combination of data manipulations. For example, for a data manipulation involving a join of two subqueries, the instruction module 250 can provide a first data-processing instruction for one subquery, a second data-processing instruction for the other subquery, and a third data-processing instruction for the join. Providing a plurality of data-processing instructions for a single data manipulation or combination of data manipulations can permit performing queries that may be too complex for a particular database, and can permit increasing parallelism (thus increasing query throughput or reducing query latency) of subqueries. As mentioned below, set-covering algorithms such as maximal munch can be used to locate defined combinations of data manipulations for which one or more data-processing instructions should be produced.

In some examples, instruction module 250 can access stored templates for various types of data manipulations, e.g., "filter," "extract," "operate," "rename," or "merge." The templates can include slots to be filled in, and instruction module 250 can fill in slot values in the slots based at least in part on at least the metadata of the data sources, the dataflow graph, or other metadata related to the job specification. Example SQL templates are shown in Table 3. In Table 3, "$\Delta_k$" represents slot k to be filled in.

TABLE 3

| Operation | Template |
| --- | --- |
| filter | WHERE $\Delta_1 = \Delta_2$ |
| extract | $\Delta_1$ |
| operation | $\Delta_1 (\Delta_2)$ |
| rename | $\Delta_1$ AS $\Delta_2$ |
| merge | SELECT $\Delta_1, \Delta_2, \ldots, \Delta_k$ FROM $\Delta_2 \Delta_3$ |

In some examples, the job specification can include a one or more dataflow graphs or data manipulations. In some examples, the job specification can include a location, e.g., a filename or URL, from which to retrieve one or more dataflow graphs or data manipulations. For example, the job specification can include (or reference a location of, and likewise throughout) a U-SQL script, e.g., supplied by entity 304. In some examples, manipulation module 248 or instruction module 250 can copy dataflow graphs or data manipulations from the job specification, or integrate dataflow graphs or data manipulations supplied in the job specification with dataflow graphs or data manipulations determined based on values in the job specification, e.g., as described above. For example, a user-provided U-SQL script can be supplied as a slot of a template. Retrieving dataflow graphs or data manipulations from a job specification can permit entity 304, e.g., an advanced user, to provide custom or optimized code for some or all of a particular job.

Figure 5:
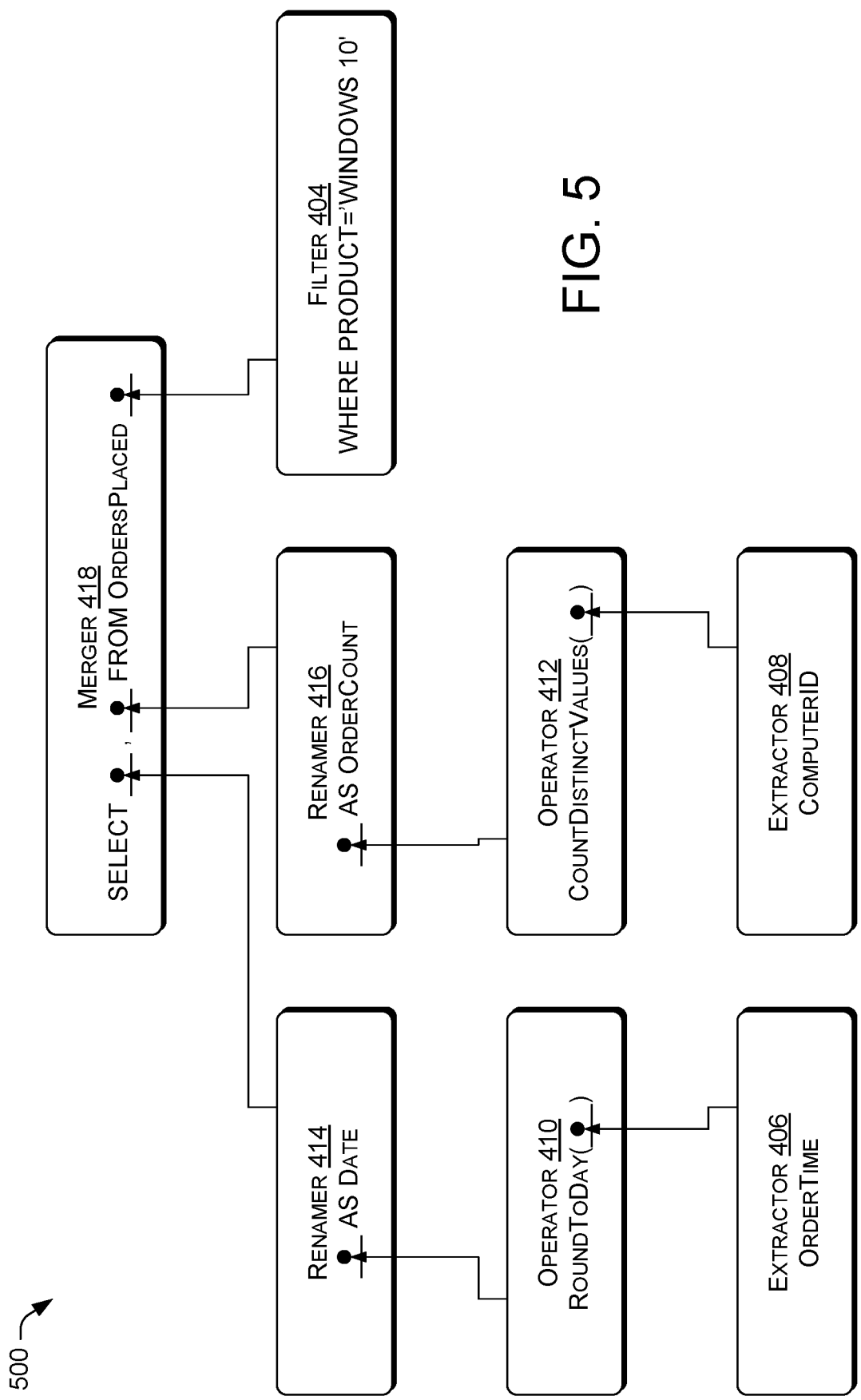
FIG. 5 shows a template tree corresponding to the example dataflow graph shown in FIG. 4.

FIG. 5 shows a template tree 500 (or DAG, and likewise throughout) for the example query of Table 2 and FIG. 4. In some examples, manipulation module 248 or instruction module 250 can provide the nodes of tree 500, e.g., by traversing the dataflow graph 400, or by parsing the job specification to directly determine the tree 500. In some examples in which the job specification conforms to a fixed pattern, e.g., of values for the controls in UI 600, instruction module 250 can retrieve a stored template tree and a stored set of templates corresponding to the fixed pattern. Instruction module 250 can then populate templates, e.g., leaf templates in the tree, with values from the job specification, or values determined based at least in part on values in the job specification.

In some examples, instruction module 250 can fill in templates (e.g., from Table 3) associated with the nodes of tree 500. Within nodes of tree 500, underlines ("_") represent those of the $\Delta_k$ slots that take other templates, in this example, and black circles in those slots connect the slots to the slot values that fill them. For example, the query template for extractor 406 is "$\Delta_1$", as shown in Table 3. Extractor 406 therefore has the completed template "Order-Time," the field name of interest in the data source (Table 2, line 5).

In some examples, instruction module 250 can retrieve a stored template corresponding to a selected one of the data manipulations. Instruction module 250 can then populate fields in the stored template based at least in part on the metadata of at least one of the data sources, e.g., a data source corresponding to the selected one of the data manipulations, to provide the at least one of the data-processing instructions.

In some examples, a single template can relate to one node of tree 500. In some examples, a single template can relate to more than one node of tree 500. In some of the latter examples, instruction module 250 or query module 252 can determine appropriate templates for tree 500 using set-covering algorithms such as those used in instruction selection for compilers, e.g., maximal munch.

In some examples, query module 252 can determine a query from the data-processing instructions, e.g., by assembling the data-processing instructions, based at least in part on the job specification. In some examples, query module 252 can determine a relative order of at least some of the data manipulations, e.g., of at least two of the data manipulations. At least two of the data-processing instructions can correspond to the at least two of the data manipulations, respectively. Query module 252 can then determine the query by assembling the data-processing instructions, e.g., the at least two of the data-processing instructions, according to the determined relative order. Some data-processing instructions may not have relative ordering constraints. Query module 252 can provide the query including such data-processing instructions arranged in the query, e.g., to reduce runtime. In some examples, query module 252 can perform reordering, dead-code elimination, hoisting loopinvariant or query-invariant expressions, unrolling loops, or other optimizations on the data-processing instructions to provide the query.

For example, the query template for operator 410 is $\Delta_1(\Delta_2)$. $\Delta_1$ is the name of the function, retrieved from the job specification, in this example "RoundToDay" (Table 2, line 7). $\Delta_2$ is the template for the relevant field, in this example the completed template for extractor 406, "OrderTime". Therefore, the completed template for operator 410 is "RoundToDay(OrderTime)". Query module 252 can traverse tree 500 to provide the completed template for merger 418. Query module 252 can traverse tree 500, e.g., in depth-first postorder, or in another order that involves determining the slot value for any given slot and filling in the template with the determined slot value. In the illustrated example, the completed template for merger 418 is the SQL statement "SELECT RoundToDate(OrderTime) AS Date, CountDistinctValues(ComputerID) as OrderCount FROM OrdersPlaced WHERE PRODUCT='WINDOWS 10'".

Constructing queries from job specifications as described herein, e.g., using trees of data manipulations and templates for data-processing instructions, can permit users to run queries without being required to learn the syntax of the query language. Various examples can permit coordinating multiple scripting languages, e.g., SQL or U-SQL queries, or JAVA source or binary applets to execute HADOOP map-reduce jobs.

In some examples, some nodes of tree 500 can have templates expressed in one language, other nodes of tree 500 can have templates expressed in another language, and still nodes of tree 500 can have templates that carry out conversions between the languages. To that end, the templates of nodes in tree 500 can include not merely text substitution, but also (or alternatively) source or binary code to perform transformations. In some examples, the query can include, in addition to or instead of a single textual query, one or more code blocks to be executed while carrying out the query. For example, a query can include an SQL statement to fetch data, followed by a JAVA application that takes data output from the SQL statement and runs a HADOOP map-reduce operation on the output from the SQL statement.

Various examples permit administrators, who can provide the templates, to specify query patterns that run efficiently on particular computing devices 102 or 104 or clusters 106. Various examples permit executing users' queries according to those query patterns without requiring users to directly specify a pattern. This can reduce the load on a cluster 106 and can permit running more concurrent jobs, or more jobs per day, on a given cluster 106. This can also permit running a particular job on multiple clusters 106, since the job specification and dataflow graph 400 can be independent of the particular cluster 106 or database 232 therein.

In some examples, query module 252, or other modules providing data thereto, can apply security attributes to a query. For example, the ability to access or run the query can be restricted to users having valid credentials, e.g., in a WINDOWS security domain. In some examples, the job specification or the produced query can include one or more triggers that indicate when the query will be executed, e.g., when a predetermined data source provides new data record(s). In some examples, the job specification or the produced query can include prerequisites or dependencies identifying other jobs or queries that should be executed before the job or query indicating the prerequisite or dependency.

In some examples, execution module 254 can be configured to execute the query, e.g., to provide desired results or analysis. Execution module 254 can, e.g., access data from at least one, or individual ones, of the data source(s) based at least in part on the query to provide query results. The query can include a single statement in a language, e.g., a single SQL statement, or multiple statements, or one or more blocks or modules of code, in any order.

Continuing the SQL/JAVA example above, the execution module 254 can transmit the SQL statement to database 232 and receive data from the database 232. The execution module can then submit the JAVA application to a HADOOP job tracker, passing command-line or environment parameters indicating the location of the data retrieved from the SQL server. Alternatively, the execution module 254 can transmit the SQL statement to database 232 and, in parallel, submit the JAVA application to a HADOOP job tracker. The execution module 254 can provide parameters permitting the JAVA application to directly retrieve results of the SQL query and pass them into the map-reduce framework. Execution module 254 can use scheduling and job-management techniques used in clusters such as cluster 106, e.g., heartbeat checking and load balancing.

In some examples, execution module 254 can execute the query once or multiple times, e.g., as indicated by the job specification. In some examples, execution module 254 can execute the query on a schedule, e.g., indicated in the job specification. For example, the job specification for the daily orders job illustrated in Table 2 can include an indication that the job should be run per day, e.g., at 5:00 AM.

In some examples, one or more data records can include timestamp fields indicating, e.g., when those records were created or updated. Retrieval module 240 can track a time at which data record(s) were retrieved from a particular data source or data stream. At various times, e.g., at least when new records become available, periodically, or on a schedule, retrieval module 240 can request from the data source or data stream only records having a timestamp later than the tracked time of retrieval, then update the tracked time of retrieval to, e.g., the current time or the latest timestamp in the newly-retrieved records. In some examples, instead of or in addition to timestamps and tracked retrieval times, monotonically-increasing record identifiers and a tracked identifier of the last record retrieved can be used (and likewise throughout), e.g., as for Transmission Control Protocol (TCP) sequence numbers.

In some examples in which the data records include timestamp fields or are otherwise associated with timestamps, query module 252 or execution module 254 can add conditions for the timeliness of data, e.g., based in timeliness information in the job specification. Continuing the example of Table 2, the job specification can include timeliness information indicating that the previous day's data should be used for the query. Query module 252 or execution module 254 can then add a filter that selects only data between 0:00:00 AM and 11:59:59 PM on the preceding day for a query run at 5:00 AM. This can provide five hours for the data to become available before running the job, and can provide accurate results for a per-day query. In some examples, the job specification can include timeliness information indicating that data should be used only if it is timestamped, or was added to database 232, within a certain time range, e.g., an absolute time such as a specific date, or a relative time such as a specific number of hours before the time the job begins running.

In some examples, output can be provided in various formats. In some examples, execution module 254 can provide results directly to database client 302. In other examples, results from execution module 254 can be transformed before transmission to the client. For example, results can be returned in a format different from the format natively provided by database 232. In some configurations, functions described below of format module 256 or instruction module 258 are performed by one or more of manipulation module 248, instruction module 250, or query module 252. In some configurations, functions described below of execution module 260 are performed by execution module 254.

In some examples, transmitting module 276 of database client 302 can transmit, to format module 256, a request for job output. In some examples, execution module 254 can trigger format module 256 to begin processing, e.g., in parallel with execution of a query or subsequent to execution of a query.

In some examples, format module 256 can determine an output format based at least in part on the job specification. Example output formats can include at least SQL databases, SQL tables, text files such as XML, JSON, tab-separated value (TSV), or comma-separated value (CSV) files, MICROSOFT EXCEL or other spreadsheet tables, uploads to other datastores or clusters 106 such as MICROSOFT AZURE or MICROSOFT AZURE SQL, AZURE blobs (binary large objects), ELASTICSEARCH or other indexes, or Portable Document Format (PDF) documents, HTML pages, or other report formats. Output can be provided in the form of statements in a query language or network transmissions. For example, as discussed below, output to SQL databases or tables can be performed by producing a text file including SQL INSERT statements to load the data, or by directly connecting to a target database and transferring data-insert commands over the connection.

In some examples, instruction module 258 can determine one or more second data-processing instructions executable to perform at least one of a copy, a move, or a transformation of the query results according to the output format. For example, for results from an SQL database 232 and a CSV output format, the second data-processing instructions can include instructions to escape double-quotes within each field, to enclose each field within double-quotes, to assemble fields of each record separated by commas, and to output each record's worth of assembled fields on a single line of a file. For example, for results to be fed to an RDBMS, e.g., of a cloud service, the second data-processing instructions can include instructions to formulate an SQL INSERT statement, to establish a connection to the RDBMS, and to provide the formulated SQL INSERT statement to the RDBMS. Similarly to configurations discussed above with reference to query module 252, the second data-processing instructions can include executable code, statements in query languages, or any combination thereof; can be constructed using templates; or can be arranged in a sequence.

In some examples, the second data-processing instructions can include instructions to reload a data set, e.g., by overwriting the target data set. This can permit efficiently updating data sets that change infrequently, e.g., a table listing the countries of the world.

In some examples, the second data-processing instructions can include instructions to track and maintain a last-run timestamp. This can be used for date-aligned data or jobs, such as jobs operating on transactional data sources in which changes happen regularly (e.g., hourly or daily). The last-run timestamp can indicate, e.g., the timestamp of the last record output. The second data-processing instructions can include instructions to process only records newer than the last-run timestamp, and then to update the last-run timestamp. Tracking a last-run timestamp can provide protection against processing a single record twice.

In some examples, the second data-processing instructions can include instructions to merge the results of a job with the output. For example, the output format can include an SQL query, and the second data-processing instructions can include SQL UPDATE statements to update existing records. Some examples of overwriting, timestamp-tracking, and merging are discussed above with reference to retrieval module 240 and storing module 244; corresponding techniques can be used in providing output.

In some examples, execution module 260 can execute the one or more second data-processing instructions to provide reported data corresponding to the query results based at least in part on the output format. For example, execution module 260 can carry out additional processing or queries as necessary to provide the desired outputs. In some examples, execution module 260 can store the output, e.g., by writing to disk, by running SQL INSERT or other database-insertion commands, or by communicating with a client application, add-in, or other module on database client 302. For example, execution module 260 can provide the results, e.g., via a Distributed COM (DCOM) link, to a MICROSOFT EXCEL add-in. This can permit directly loading results into users' applications, reducing the time, memory requirements, and network-bandwidth requirements of providing the data to the users.

In some examples, execution module 260 or another component of reporting engine 208 can produce a notification indicating the reported data have been provided. For example, execution module 260 can transmit (or cause to be transmitted, and likewise throughout) an email, instant message, text message, automated phone call, or other communication indicating the reported data have been provided; update an RSS feed; post an announcement to an online site; or otherwise notify at least entity 304 or other interested entities, e.g., other members of a workgroup, that the reported data have been provided. Such notifications can include or be included in, or can be instead of or in addition to, any notifications provided by, e.g., a job-management system of cluster 106. Transmitting notifications can permit users to promptly locate results of long-running or scheduled jobs. The transmitted notifications can also serve as push or pull notifications for configurations in which the output of a job serves as a data source for another job.

Figure 6:
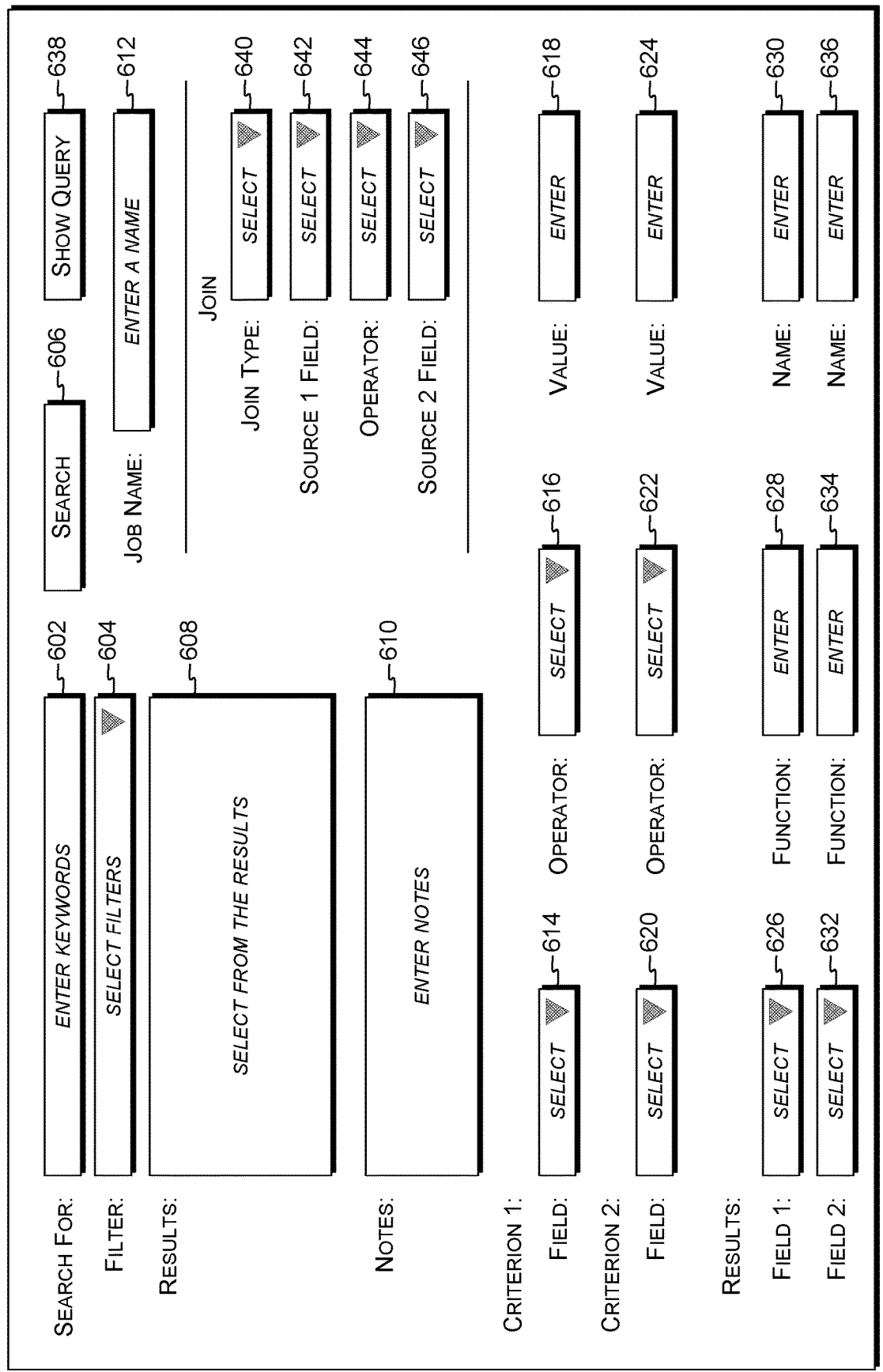
FIG. 6 is a graphical representation of an example database user interface.

FIG. 6 is a graphical representation of an example user interface (UI) 600, e.g., as discussed above with reference to modules of the specification engine 210 and interaction engine 214. UI 600 (and example UIs in FIGS. 15-16, below) can represent, e.g., a dialog box, Web page, or text-based entry screen for collecting data. For example, UI 600 can represent UI 152, FIG. 1. UI 600 (and example UIs in FIGS. 15-16) can be presented by presenting module 274 of database client 302. In FIG. 6 (as also in FIGS. 15-16), the number and types of controls shown are solely for purposes of illustration and are not limiting. Any number of controls of any type can be included in a particular user interface. The illustrated controls can also be divided across multiple user interfaces, e.g., one user interface for locating a data source and another for providing the job specification once the data source is located.

The example UI 600 includes two data-source search controls: a fulltext search text control 602 and a filtering dropdown 604. Controls 602 and 604 can receive information that is then provided to weighting module 264 or searching module 266. Searching module 266 can then run a search for data sources matching the criteria provided in controls 602 and 604, as described above. Control 602 can receive keywords or terms to be searched full-text, e.g., using an inverted index as noted above. Control 604 can be a dropdown (indicated by the triangle) of categories, providers, or other non-full-text fields that can distinguish data sources from each other. Search can be performed when the user activates search control 606, e.g., a pushbutton, or incrementally as the user makes selections or enters data in controls 602 and 604. In some examples, control 604 or another control (omitted for brevity) can permit entity 304 to select from a list of "favorite" or "starred" data sources designated by entity 304.

Search results control 608 can include a table, grid, hierarchical tree, list box, e.g., a scrollable list box, or other list of data sources matching the terms provided in controls 602 and 604. Search results control 608 can serve as a data-source selection control, permitting the user to click on, select, check off, or otherwise designate one or more data sources to be used in the job.

Annotation control 610 can include, e.g., a free-form multiline text area permitting the user to enter annotations to the job (or a data source or target, as noted above, and likewise throughout). Annotation control 610 can additionally or alternatively permit adding non-textual annotations, e.g., PDF documents describing the job's purpose. Job-name control 612 can include, e.g., a text entry control permitting the user to enter a name for the job. As discussed above, the job name and annotations can be stored in the metadata repository 234 and searched in order to facilitate using the job results as a data source for another job.

Example UI 600 includes three query-criterion controls for each of two criteria. The number of controls and criteria is one example and is not limiting. The query-criterion controls can provide information, e.g., useful in building WHERE clauses in SQL statements, e.g., as discussed above with reference to filter 404. The illustrated first criterion includes field control 614, operator control 616, and value control 618. The illustrated second criterion includes field control 620, operator control 622, and value control 624. Field controls 614 and 620 can receive selections of fields (e.g., names of fields) from the data source. Operator controls 616 and 622 can receive selections of operators to apply to the values in the respective fields, e.g., relational operators. Value controls 618 and 624 can receive values with which the values in the respective fields should be compared. In the example of Table 2, criterion 1 can have "PRODUCT" selected in field control 614, "equals" selected in operator control 616, and "WINDOWS 10" selected in value control 618.

Example UI 600 also includes three result-field controls for each of two result fields. The result-field controls can provide information, e.g., indicating the results or analysis the job is intended to provide, e.g., as discussed above with reference to extractors 406 and 408, operators 410 and 412, and renamers 414 and 416. The illustrated first result controls include source-field control 626, function control 628, and result-name control 630. The illustrated second result controls include source-field control 632, function control 634, and result-name control 636. Source-field controls 626 and 632 can receive names of fields of the data sources, e.g., as discussed above with reference to extractors 406 and 408. Function controls 628 and 634 can receive selections or names of functions to apply to values of the respective fields, e.g., as discussed above with reference to operators 410 and 412. Result-name controls 630 and 636 can receive text indicating the name the resulting output values of the job should carry. In the example of Table 2, source-field control 626 can have a selection of the "OrderTime" field, function control 628 can have a selection or indication of the function "RoundToDay," and result-name control 630 can have the text "Date."

The illustrated UI 600 also includes a query-display control 638, in this example a push button labeled "Show Query." Query-display control 638 can present, or when actuated cause to be presented, the query produced for the job specification being provided via UI 600. For examples, when entity 304 presses the "Show Query" button, the presenting module 274 can show, in a popup or other user interface control, the produced SQL, U-SQL, JAVA, or other scripts, programs, or portions of the query. This can permit users to modify a query in ways not provided for by UI 600, or to learn query techniques useful for the particular database environment in which the query is to be run.

In some examples, the job specification can specify querying data from two or more data sources, referred to as a "join" between the data sources. Joins can include, e.g., SQL JOIN clauses in a SELECT statement or other techniques for retrieving related information from two or more data sources. Illustrated UI 600 shows example user-interface controls useful for specifying joins.

The illustrated UI 600 includes join controls 640-646. Join-type control 640 can receive a selection of the type of join, e.g., an SQL INNER JOIN, LEFT OUTER JOIN, or RIGHT OUTER JOIN. First-source-field control 642 can receive a selection of a field of a first selected data source to be used in locating related data records. Join-operator control 644 can receive a selection of an operator to be used in locating related data records. Second-source-field control 646 can receive a selection of a field of a second selected data source to be used in locating related data records. The job specification can then indicate that the filter 404 (or a separate join module, and likewise throughout) provide data records in which the value of the field indicated in control 642 has the relationship indicated in control 644 to the value of the field indicated in control 646. Based on the type of join indicated in control 640, the filter 404 can provide only those data records, or can provide those data records and additionally other data records (e.g., records in which the value of the field indicated in control 642 or 646 is NULL).

In illustrated UI 600 and other examples described or shown herein, field controls (e.g., 614 or 642) or value controls (e.g., 618, 624) can support fields having various data organizations. Example data organizations can include scalars, e.g., single string or numeric values; record types having named sub-fields; array types having multiple numbered sub-fields, or any combination thereof. For example, the data organization of a "car" field can be a record having fields for color, engine displacement, and stereo power. The car record can further include an array sub-field having respective values for the tire pressure at each wheel. Field controls or value controls, in some examples, can permit users to specify a particular sub-field (or sub-sub-field, . . . ) within a field, or to specify values for particular sub-fields (or sub-sub-fields, . . . ).

Illustrative Processes

Figure 7:
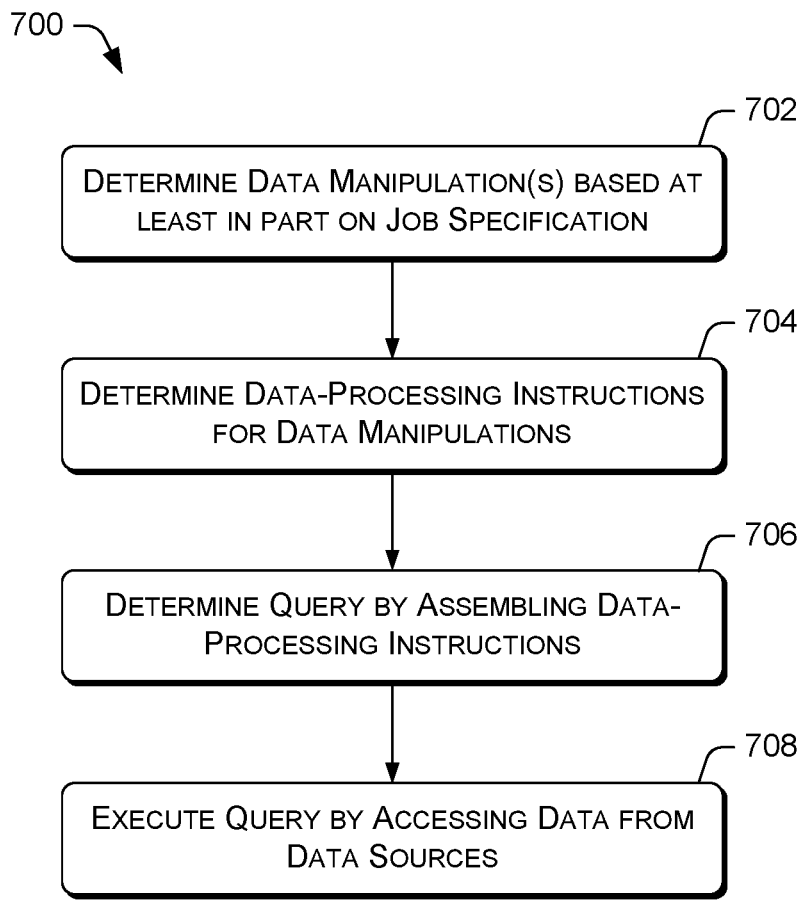
FIG. 7 is a flow diagram that illustrates example processes for operating a database according to various examples described herein.

FIG. 7 is a flow diagram that illustrates an example process 700 for operating a database. Example functions shown in FIG. 7 and other flow diagrams and example processes herein can be implemented on or otherwise embodied in one or more computing device(s) 102 or 104, e.g., a computing device 200, e.g., using software running on such device(s). For the sake of illustration, the example process 700 is described below with reference to processing unit 224 and other components of computing device 200, FIG. 2, that can carry out or participate in the steps of the exemplary method. However, other processing unit(s) such as processing unit 112 and/or other components of computing device(s) 102 or 104 can carry out step(s) of described example processes such as process 700. Similarly, exemplary method(s) shown in FIGS. 8-14 are also not limited to being carried out by any specifically-identified components.

The order in which the operations are described in each example flow diagram or process is not intended to be construed as a limitation, and any number of the described operations can be combined in any order and/or in parallel to implement each process. As noted above, any of the described operations can be performed on other items in addition to any specifically-identified items or other items in any given group of items. For example, block 704, discussed below, can operate on or be performed using fewer than all the determined data manipulations.

Moreover, the operations in each of FIGS. 7-14 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

In some examples, at block 702, one or more data manipulations can be determined based at least in part on a job specification. One or more of a plurality of data sources can be associated with the job specification. Some examples are described above with reference to the manipulation module 248.

In some examples, at block 704, for individual ones of the data manipulations, one or more data-processing instructions can be determined based at least in part on metadata of individual ones of the data sources associated with the job specification. Some examples are described above with reference to the instruction module 250.

In some examples, at block 706, a query can be determined by assembling the data-processing instructions based at least in part on the job specification. Some examples are described above with reference to the query module 252.

At block 708, the query can be executed, e.g., by accessing data from individual ones of the data sources based at least in part on the query to provide query results. Some examples are described above with reference to the execution module 254.

Figure 8:
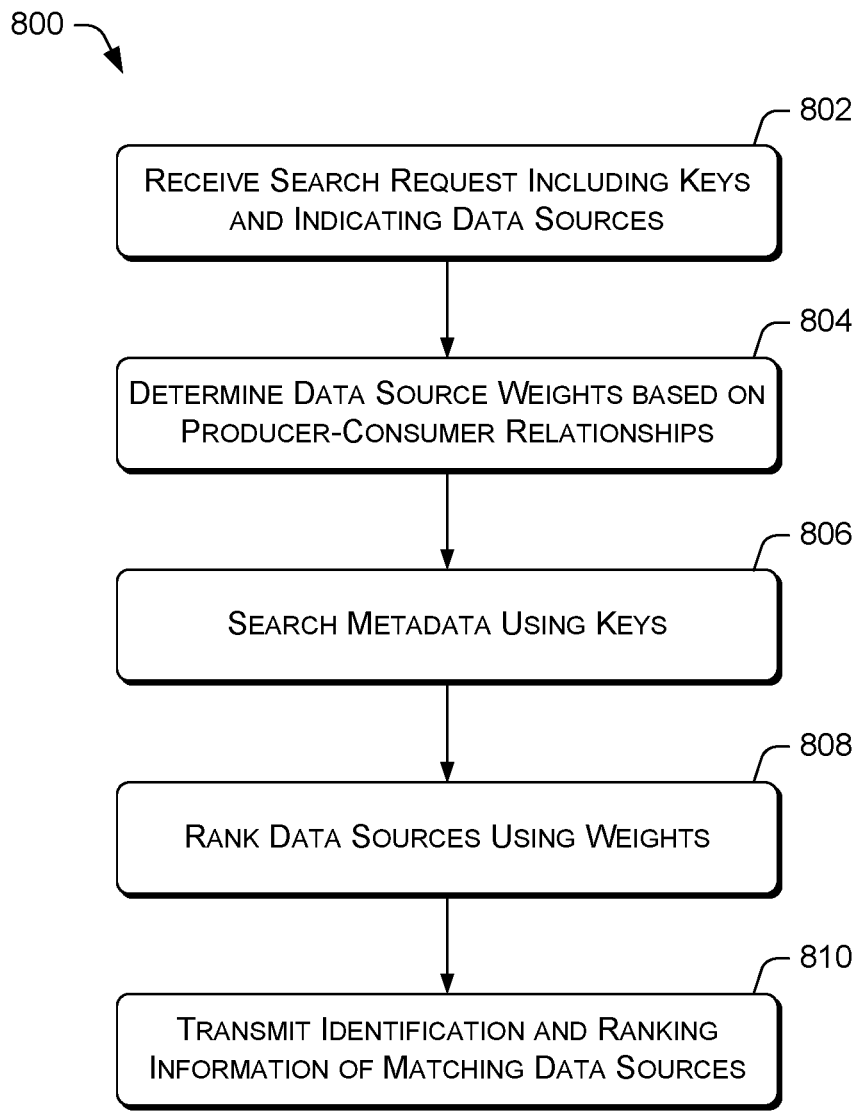
FIG. 8 is a flow diagram that illustrates example processes for searching a database according to various examples described herein.

FIG. 8 is a flow diagram that illustrates an example process 800 for searching a database 232. Some examples include searching a metadata repository 234.

At block 802, a search request can be received. The search request can include one or more search keys and can indicate multiple data sources. Some examples are described above with reference to the receiving module 262.

At block 804, respective weights of ones of the data sources can be determined based at least in part on producer-consumer relationships between ones of the plurality of the data sources. Some examples are described above with reference to the weighting module 264.

At block 806, metadata of the data sources can be searched using the search keys and the determined weights to identify matching ones of the data sources corresponding to the search request. Some examples are described above with reference to the searching module 266.

At block 808, ranking information of at least two of the matching data sources (for brevity, "matches") can be determined based at least in part on the determined weight. Some examples are described above with reference to the searching module 266.

At block 810, identification information of the matching ones of the data sources can be transmitted. The ranking can also be transmitted. Some examples are described above with reference to the transmitting module 268.

Figure 9:
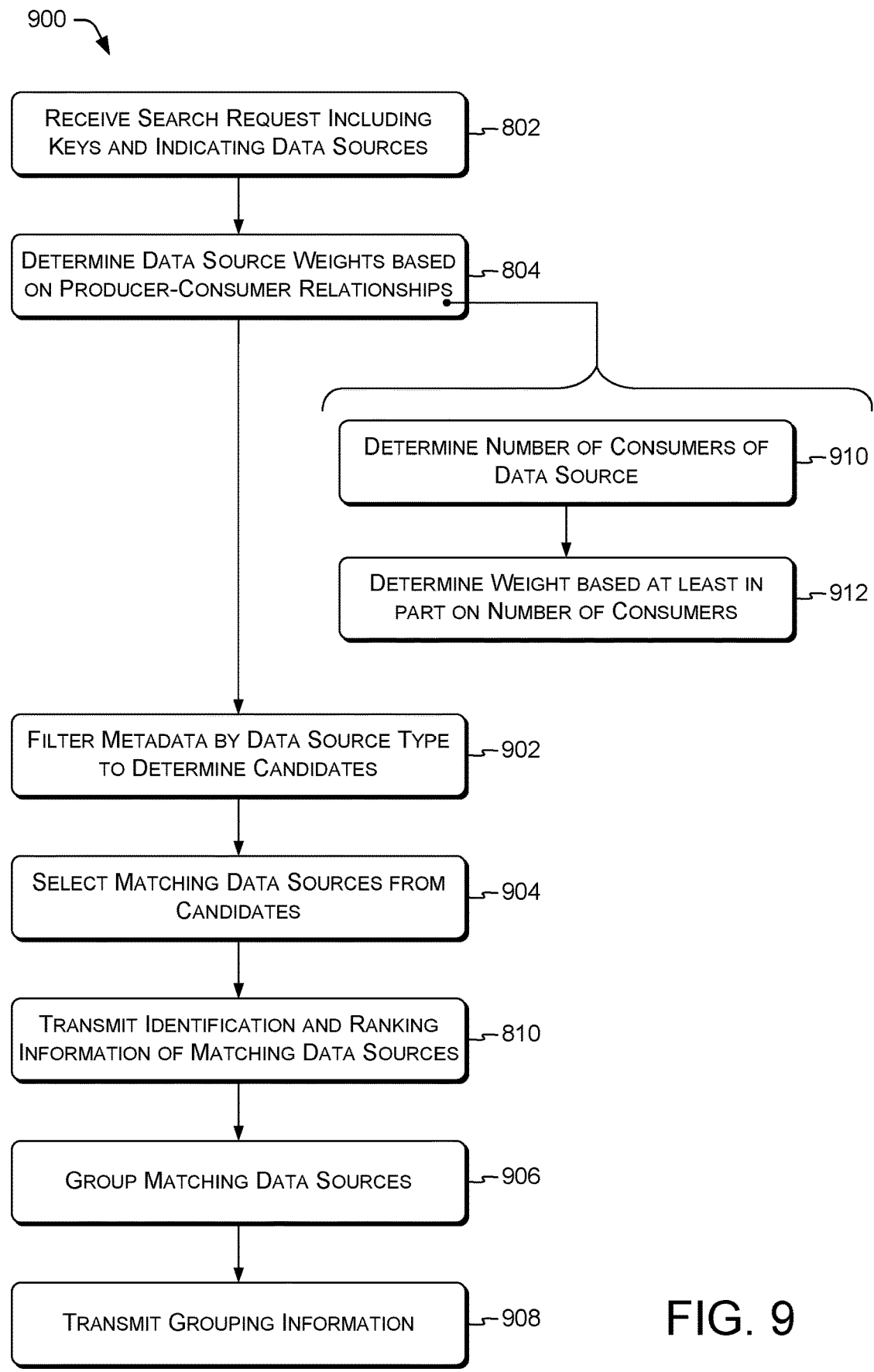
FIG. 9 is a flow diagram that illustrates example processes for searching a database according to various examples described herein.

FIG. 9 is a flow diagram that illustrates an example process 900 for searching a database 232. Some examples include searching a metadata repository 234. Block 804 can include or be followed by block 902. Block 810 can include or be preceded or followed by block 906.

At block 902, the metadata of the data sources can be filtered based at least in part on at least a type of data source to identify candidate ones of the data sources. Some examples are described above with reference to the searching module 266.

In some examples, block 904 can include selecting the matching ones of the data sources from the candidate ones of the data sources based at least in part on at least some of the search keys. Other functions of block 904 can be as discussed above with reference to block 806. Some examples are described above with reference to the searching module 266. Block 904 can be followed by block 810.

At block 906, at least some of the matching ones of the data sources can be grouped based at least in part on at least types or sources of the at least some of the matching ones of the data sources to provide grouping information. Some examples are described above with reference to the searching module 266 and the transmitting module 268.

At block 908, or as part of block 810, the grouping information can be transmitted in association with the identification information and the ranking information. Some examples are described above with reference to the transmitting module 268.

In some examples, block 804 can include blocks 910 and 912.

At block 910, for a selected data source of the data sources, a number of consumers of the selected data source can be determined based at least in part on the metadata of the data sources. Some examples are described above with reference to the weighting module 264.

At block 912, the respective weight for the selected data source can be determined based at least in part on, and positively correlated with, the number of consumers. Some examples are described above with reference to the weighting module 264. Blocks 910 and 912 can be performed for each of one or more of the data sources.

Figure 10:
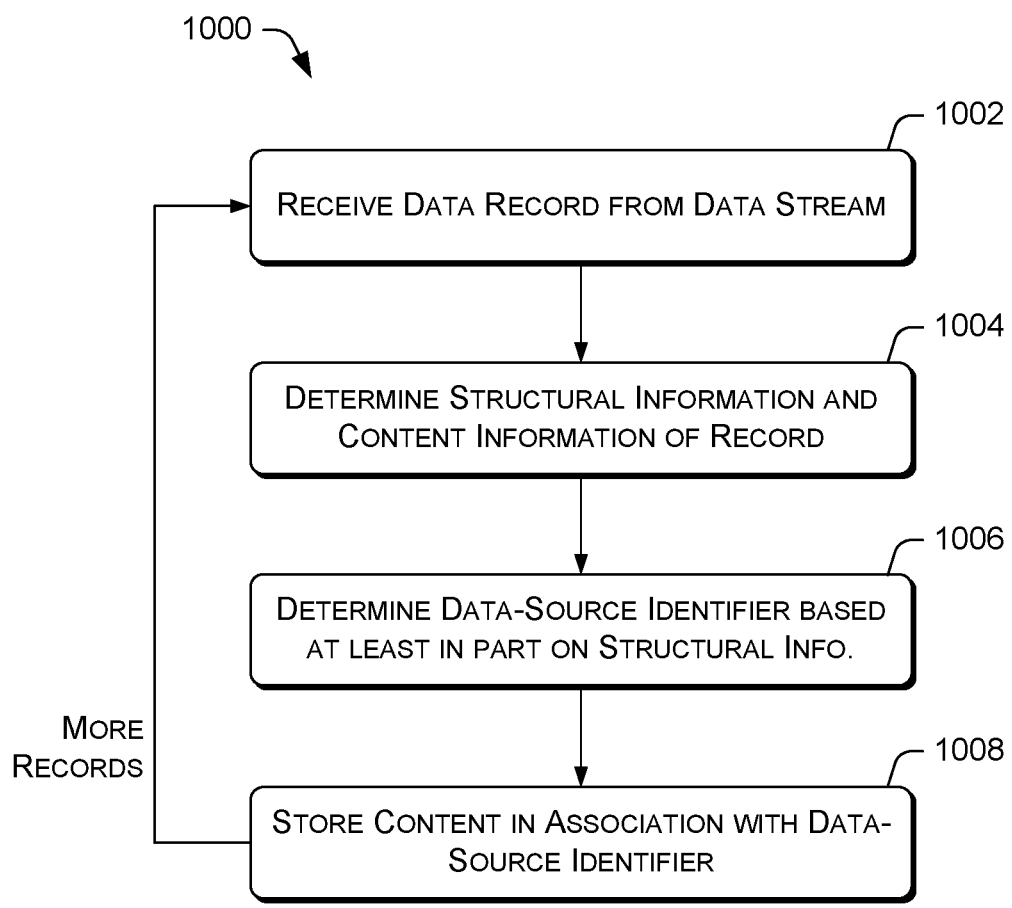
FIG. 10 is a flow diagram that illustrates example processes for searching a database according to various examples described herein.

FIG. 10 is a flow diagram that illustrates an example process 1000 for updating a database.

At block 1002, a data record can be received from a data stream. Some examples are described above with reference to the retrieval module 240.

At block 1004, structural information of the data record and content information of the data record can be determined. Some examples are described above with reference to the metadata module 242.

At block 1006, a data-source identifier can be determined based at least in part on the structural information. Some examples are described above with reference to the metadata module 242.

At block 1008, the content information can be stored into a database 232 in association with the data-source identifier. Some examples are described above with reference to the storing module 244.

In some examples, block 1008 can be followed by block 1002. In this way, when additional data records are available, they can be processed as described in blocks 1002-1008. Accordingly in some examples, the process 1000 can include receiving a plurality of data records from the data stream, the plurality of records including the data record (block 1002).

In some examples, block 1006 or block 1008 can be followed by, or can include functions of, at least one of blocks 702, 704, 706 or 708, FIG. 7. For example, the data-source identifier from block 1006 can be included in the job specification processed in block 702. This can permit running jobs against newly-received information. In some examples, after block 1006 or block 1008, a data manipulation can be determined based at least in part on a job specification, wherein a data source identified by the data-source identifier determined in block 1006 is associated with the job specification (e.g., as in block 702). A data-processing instruction can be determined based at least in part on the data manipulation and at least some metadata of the data source (e.g., as in block 704). A query can be determined from the data-processing instruction based at least in part on the job specification (e.g., as in block 706). The query can be executed by accessing data from the data source based at least in part on the query to provide query results (e.g., as in block 708).

In some examples, block 1006 or block 1008 can be followed by, or can include functions of, at least one of blocks 802, 804, 806, 808, or 810, FIG. 8. This can permit searching of newly-arrived records, e.g., records that arrive after the UI 600 is initially presented but before entity 304 completes a job specification. In some examples, after block 1006 or block 1008, a search request can be received (e.g., as in block 802). The search request can include one or more search keys and can indicate a plurality of data sources. The plurality of data sources can include a first data source identified by the data-source identifier determined in block 1006. A weight of the first data source can be determined based at least in part on producer-consumer relationships between at least two data sources of the plurality of the data sources (e.g., as in block 804). Metadata associated with at least one data source of the plurality of data sources, e.g., the first data source, can be searched using the search keys to identify matching data sources of the plurality of data sources, wherein the matching data sources correspond to the search request (e.g., as in block 806). Ranking information of at least the first data source and a second data source of the plurality of the data sources can be determined based at least in part on the determined weight (e.g., as in block 808). Identification information of the matching data sources, and the ranking information, can be transmitted (as in block 810).

Figure 11:
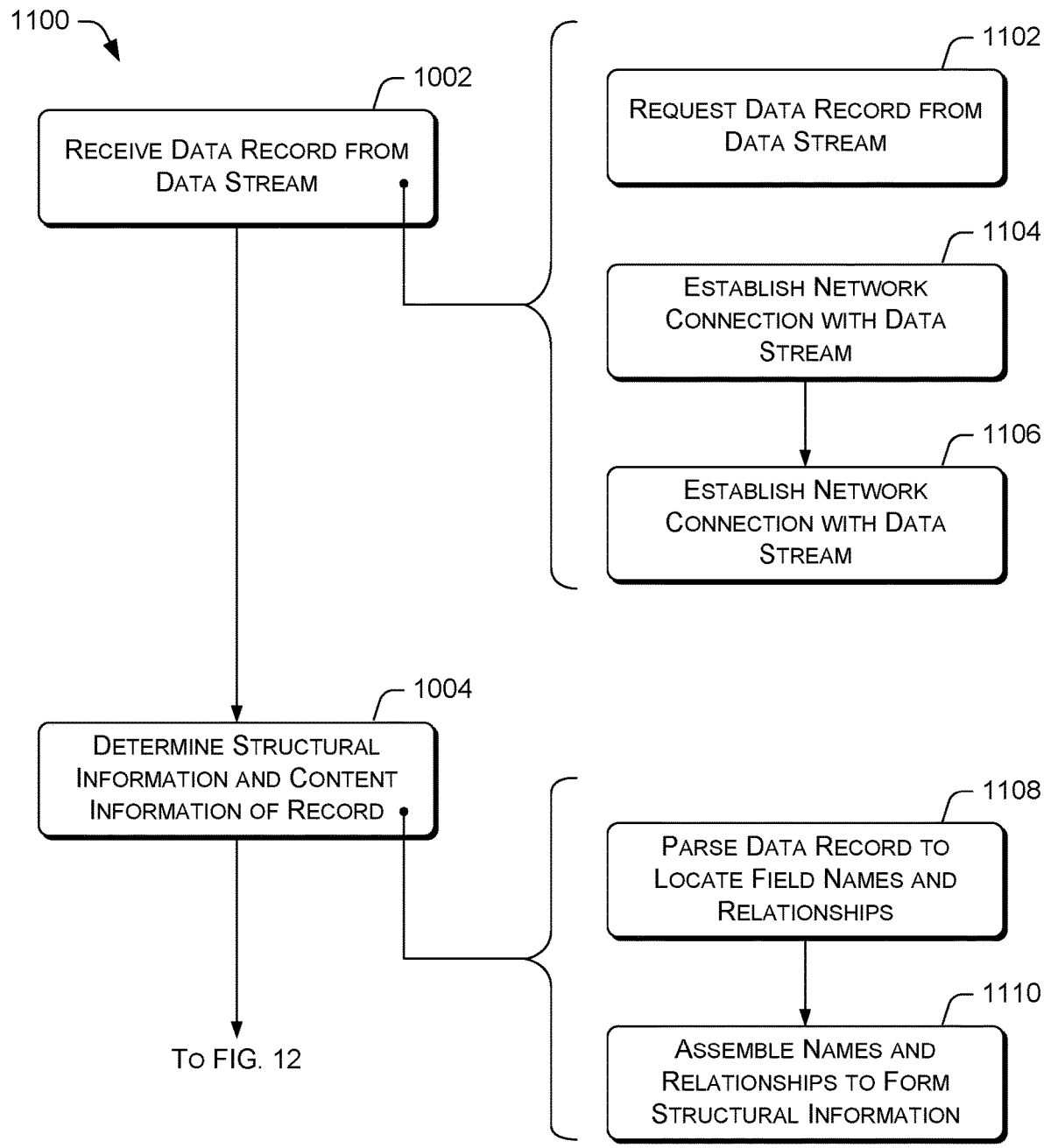
FIG. 11 is a flow diagram that illustrates example processes for updating a database according to various examples described herein.

FIG. 11 is a flow diagram that illustrates example processes 1100 for updating a database. In some examples, block 1002 can include block 1102 or blocks 1104-1106. In some examples, block 1004 can include blocks 1108 and 1110.

At block 1102, the data record can be requested from the data stream. Some examples are described above with reference to the retrieval module 240.

At block 1104, a network connection can be established with the data stream. Some examples are described above with reference to the retrieval module 240.

At block 1106, the data record can be received via the network connection. Some examples are described above with reference to the retrieval module 240.

At block 1108, the received data record can be parsed to locate one or more field names and one or more field relationships in the received data record. Some examples are described above with reference to the metadata module 242.

At block 1110, the field names and the field relationships can be assembled to provide the structural information. Some examples are described above with reference to the metadata module 242.

As noted above, in some examples, block 1008 can be followed by block 1002 (FIG. 10), e.g., to process multiple data records. In some examples, the process 1000 or 1100 can include receiving a plurality of data records from the data stream, the plurality of records including the data record. This can be done as described above with reference to block 1002. Accordingly, block 1004 can include determining respective structural information records for individual data records of the plurality of data records, one of the respective structural information records including the structural information for the data record.

Figure 12:
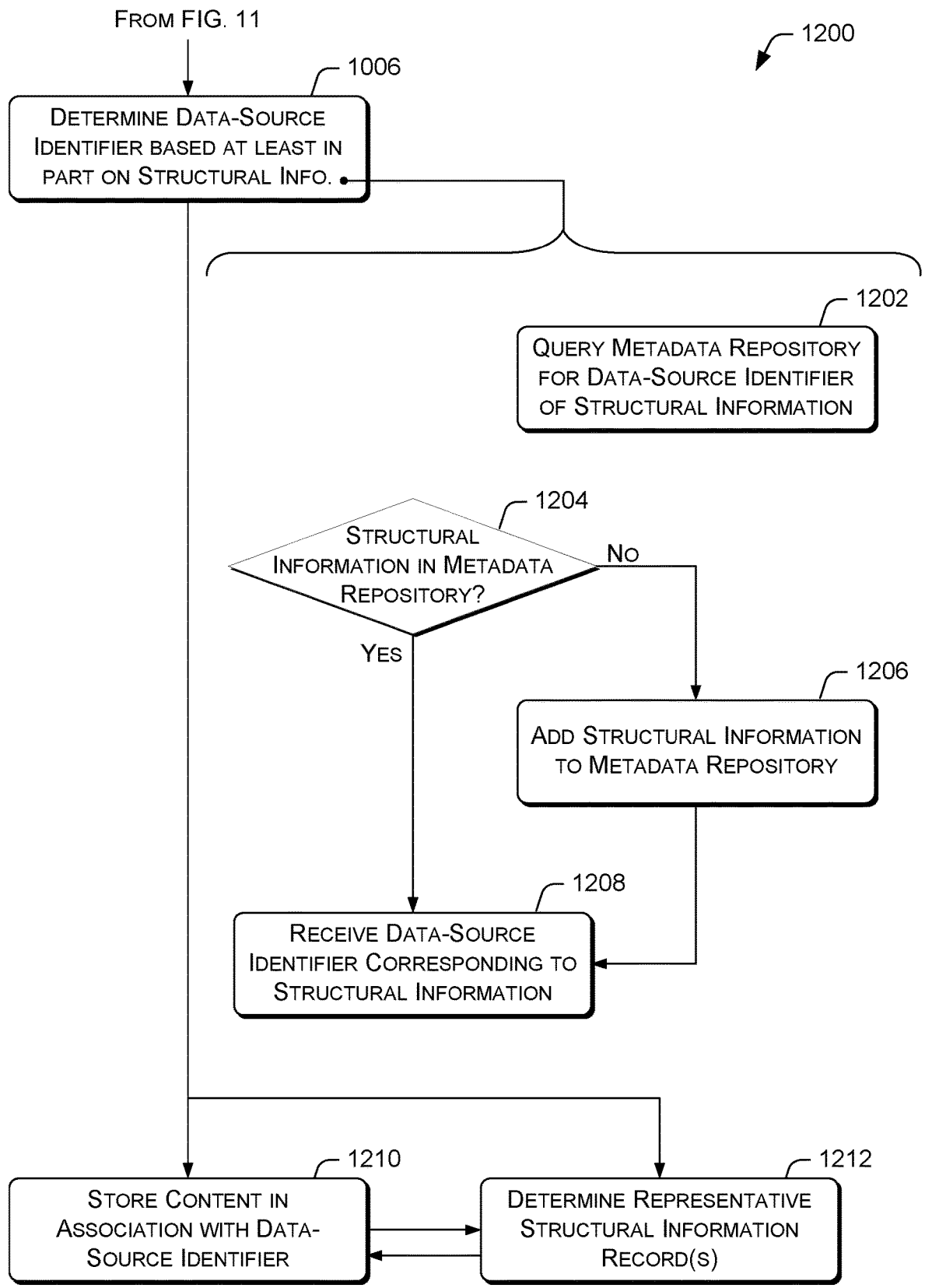
FIG. 12 is a flow diagram that illustrates example processes for updating a database according to various examples described herein.

FIG. 12 is a flow diagram that illustrates example processes 1200 for updating a database. In some examples, block 1006 can include block 1202 or blocks 1204-1208. Accordingly, processing in block 1006 can begin, on FIG. 12, with block 1202 or block 1204. Block 1006 can be followed by block 1210 or block 1212.

At block 1202, the metadata repository 234 can be queried for the data-source identifier corresponding to the structural information. Some examples are described above with reference to the metadata module 242.

At block 1204, the metadata repository 234 can be queried to determine whether the structural information is represented in the metadata repository 234. Some examples are described above with reference to the metadata module 242. If not, block 1204 can be followed by block 1206. If so, block 1204 can be followed by block 1208.

At block 1206, in response to the structural information being missing from or not found in the metadata repository, the structural information can be added to the metadata repository. Some examples are described above with reference to the metadata module 242.

At block 1208, the data-source identifier corresponding to the structural information can be received from the metadata repository. Some examples are described above with reference to the metadata module 242. In some examples, functions of blocks 1206 and blocks 1208 can be performed in a single block.

At block 1210, content information can be stored, e.g., as discussed above with reference to block 1008. Block 1210 can include or be preceded or followed by block 1210. As noted above, in some examples, block 1008 can be followed by block 1002 (FIG. 10), e.g., to process multiple data records.

At block 1212, one or more representative structural information records can be determined of or from the respective structural information records. Individual representative structural information records, e.g., each representative structural information record, can be associated with a respective data-source identifier and can correspond to one or more of the individual data records, e.g., as discussed above with reference to the metadata module 242. In an example, two different types of data records are received from an aviation-telemetry data stream: location records containing a latitude and a longitude, and engine records including coolant temperature and oil pressure. The location records can be associated with a first representative structural information record including, e.g., field names "latitude" and "longitude." The engine records can be associated with a second representative structural information record including, e.g., field names "temp" and "press."

At block 1212, or at block 1210 after block 1212, the individual data records can be stored into the database in association with the data-source identifiers of the corresponding representative structural information records (e.g., as in block 1008). This can permit storing records having the same structural information in the database in association with the same data-source identifier, which can facilitate search of those records.

Figure 13:
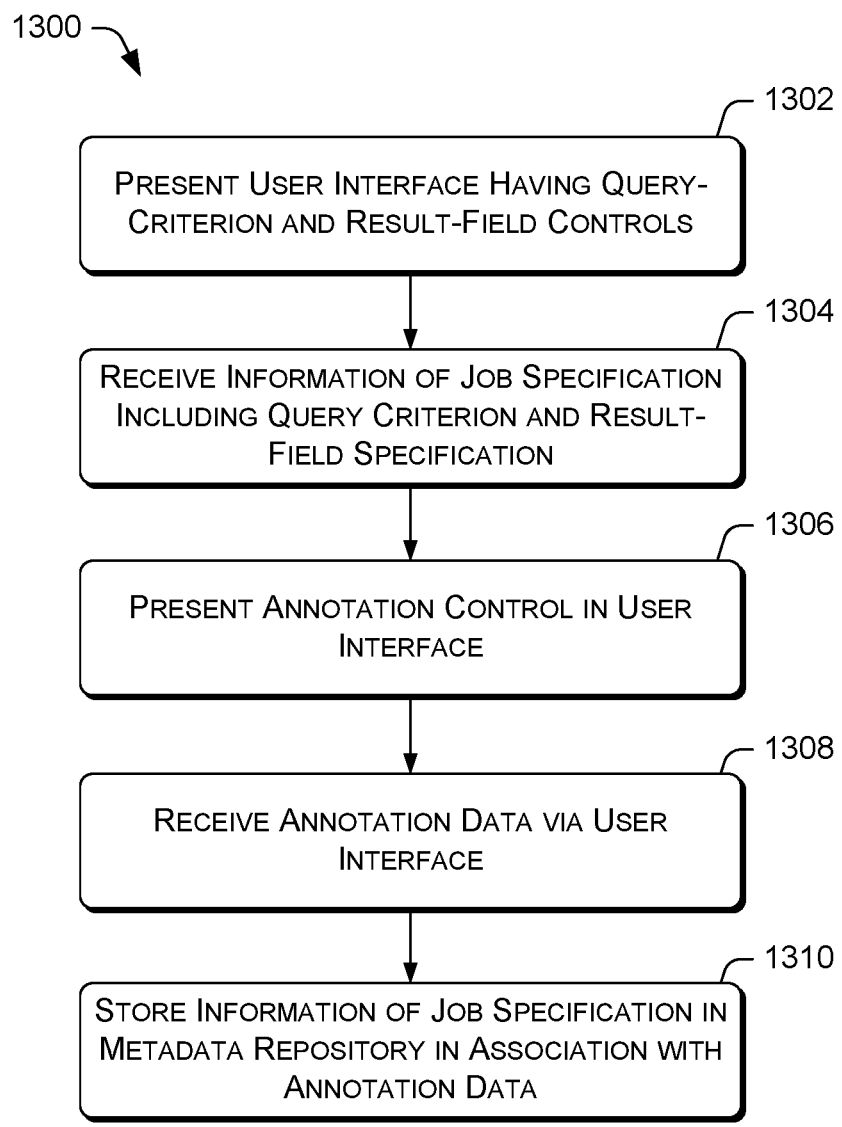
FIG. 13 is a flow diagram that illustrates example processes for updating a metadata repository according to various examples described herein.

FIG. 13 is a flow diagram that illustrates an example process 1300 for updating a metadata repository 234.

At block 1302, a user interface can be presented, e.g., a Web page or dialog box. The UI can include one or more query-criterion controls and one or more result-field controls. Some examples are described above with reference to the UI 600, FIG. 6. Some examples are described above with reference to the presenting module 274.

At block 1304, via the user interface, information is received of a job specification. The job specification includes at least one query criterion and at least one result-field specification. Some examples are described above with reference to the presenting module 274.

At block 1306, an annotation control can be presented in the user interface, e.g., annotation control 610. Some examples are described above with reference to the presenting module 274.

At block 1308, annotation data can be received via the user interface. Some examples are described above with reference to the presenting module 274.

At block 1310, the information of the job specification can be stored in metadata repository 234 in association with the annotation data. Some examples are described above with reference to the transmitting module 276.

Figure 14:
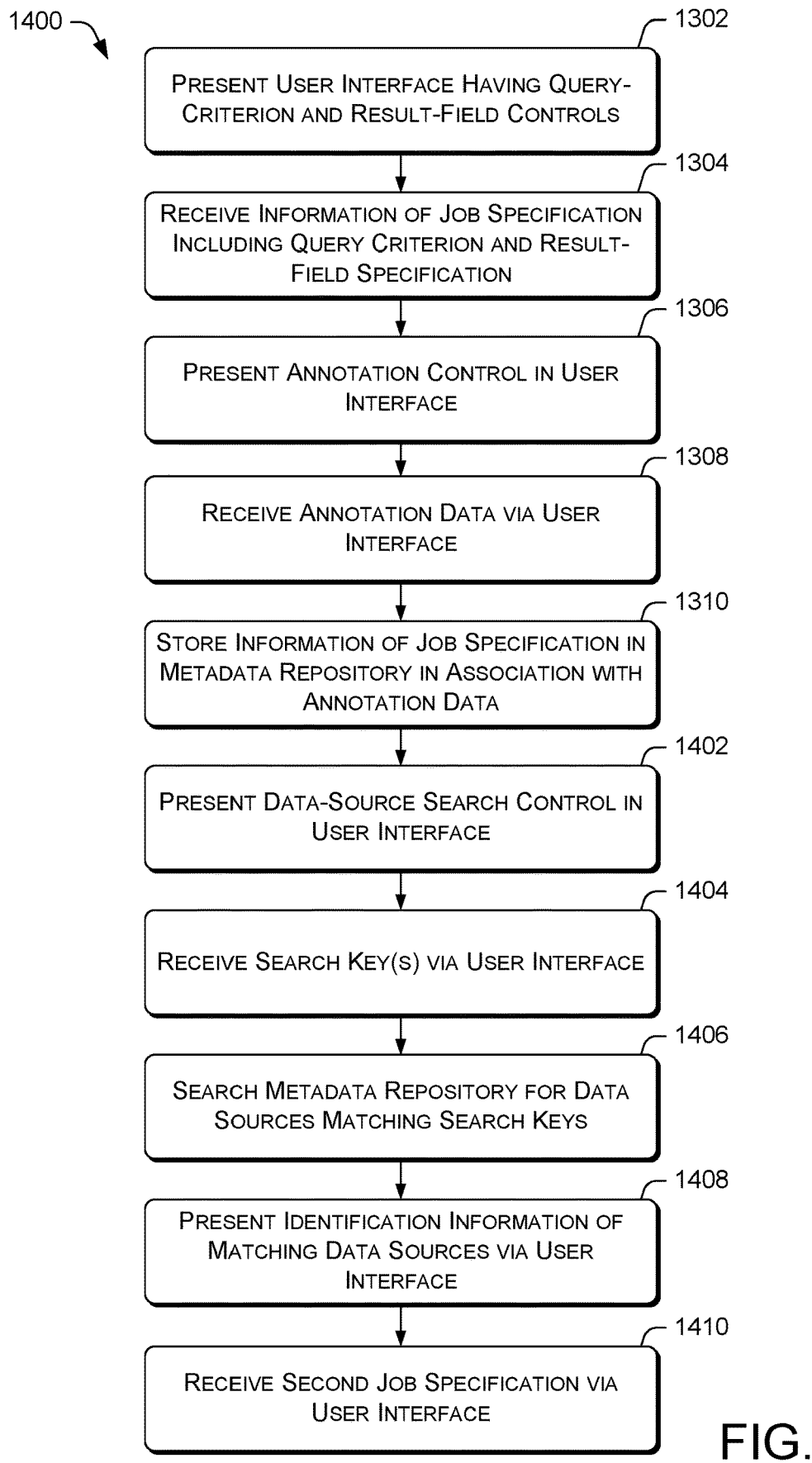
FIG. 14 is a flow diagram that illustrates example processes for searching a metadata repository according to various examples described herein.

FIG. 14 is a flow diagram that illustrates an example process 1400 for searching a metadata repository 234. Block 1310 can be followed by block 1402.

At block 1402, a data-source search control can be presented in the user interface. Some examples are described above with reference to the presenting module 274.

At block 1404, one or more search keys can be received via the user interface. Some examples are described above with reference to the presenting module 274.

At block 1406, the metadata repository can be searched for data sources matching the search keys to provide matching data sources. The searching can include at least searching stored annotation data. This can be done, e.g., as discussed above with reference to FIG. 8 or 9. The annotation data can be stored or searched as a distinct metadata field containing only annotation data, or can be stored or searched together with other metadata. For example, at block 1406, a weight can be determined of a data source of the data sources based at least in part on producer-consumer relationships between at least two data sources of the data sources, e.g., as in block 804. Ranking information can be determined of at least two of the matching data sources based at least in part on the determined weight, e.g., as in block 808. The ranking information of the at least two of the matching data sources can be presented in the user interface. For example, the at least two of the matching data sources can be presented in search-results control 608, FIG. 6, with higher-ranked data sources visually above lower-ranked data sources.

At block 1408, identification information of the matching data sources can be presented via the user interface. Some examples are described above with reference to the presenting module 274. In some examples, one of the matching data sources can be a job specification previously provided, e.g., by entity 304. In some of these examples, block 1408 can be followed by block 1410.

At block 1410, a second job specification can be received via the user interface. The second job specification can include a designation of the job specification as a data source. Some examples are described above with reference to the presenting module 274.

Illustrative Interfaces

Figure 15:
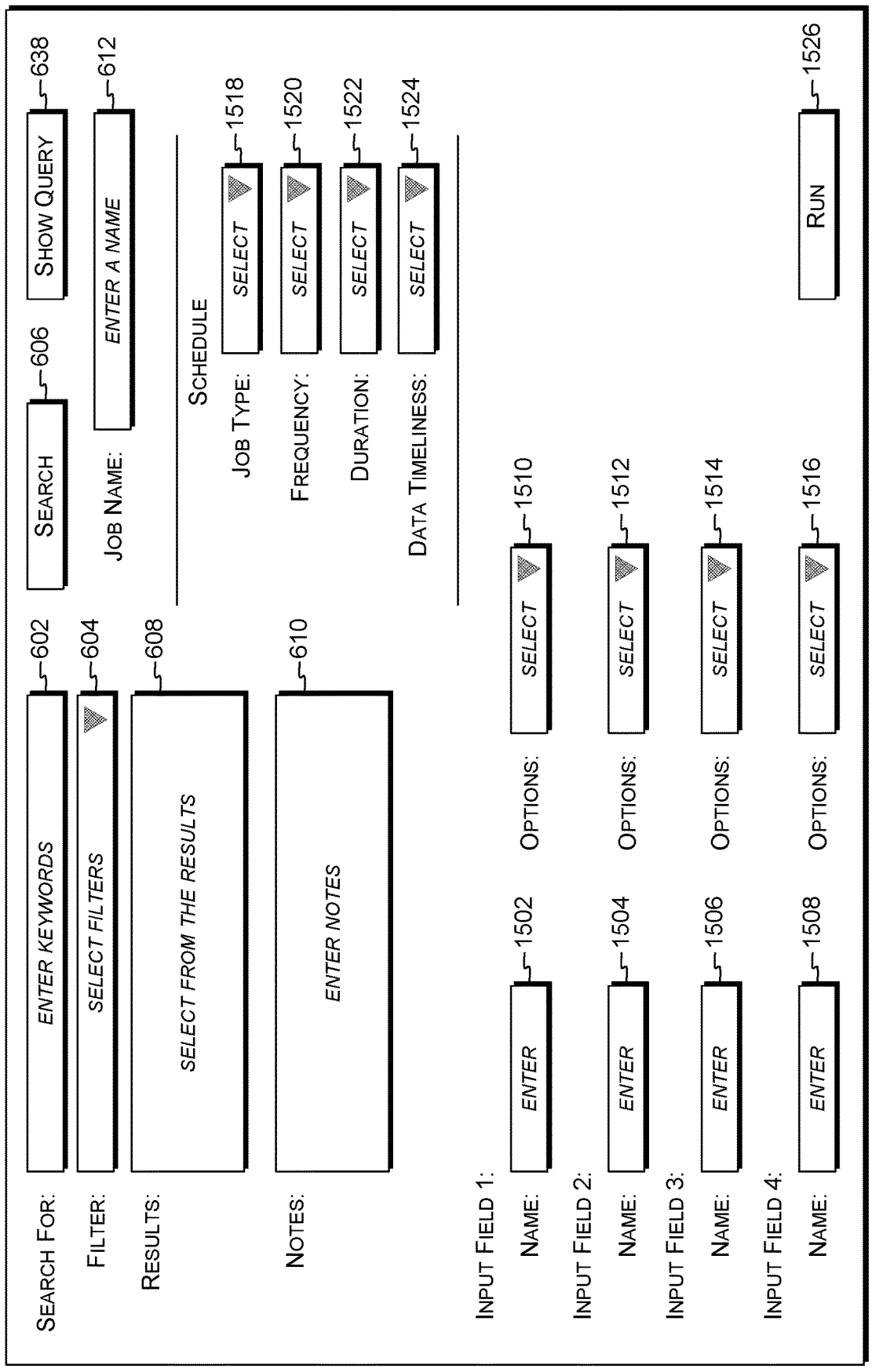
FIG. 15 is a graphical representation of an example data-ingestion user interface.

FIG. 15 is a graphical representation of an example user interface (UI) 1500 for an ingestion job, e.g., as discussed above with reference to modules of the ingestion engine 202, specification engine 210, and interaction engine 214. Some controls can be as discussed above with reference to FIG. 6, as indicated by the part numbers. Example UI 1500 can receive indications of any number of fields to ingest into database 232.

Input-field controls of the example UI 1500 can include field-name controls 1502, 1504, 1506, and 1508 that receive the names of fields to be placed into the data source. Although shown as entry controls, at least some of the controls 1502-1508 can be selection controls, e.g., to select from names used by the data source providing the data records. Input-field controls in this example also include options controls 1510, 1512, 1514, and 1516 for receiving processing options to be applied to the fields named in controls 1502-1508, respectively. Example options can include at least preserving watermarks, removing watermarks, escaping field values (e.g., adding quotes or backslashes), unescaping field values, changing text encoding (e.g., normalizing Unicode, or converting between UTF-8 and UTF-16), compressing, uncompressing, obfuscating, deobfuscating, encrypting, or decrypting.

Illustrated UI 1500 also includes job-scheduling fields 1518-1524. Other example UIs herein, e.g., UI 600, can include job-scheduling fields 1518-1524. Although shown as selection fields, at least some of the job-scheduling fields 1518-1524 can be entry fields. More, fewer, or different job-scheduling fields can be used than are shown here.

In the illustrated example, job-type field 1518 can receive an indication of whether the job is, e.g., to be run once as soon as possible, to be run once on a schedule, or to be run multiple times on a schedule. Job-frequency field 1520 can receive an indication of how often the job should be run, e.g., hourly, daily, weekly, every other week, or every third Thursday. Job-duration field 1522 can receive an indication of when the job should cease to be run, e.g., after n runs (n≥1), or after a specific date. Data-timeliness field 1524 can receive an indication of which data should be used on each run of the job, e.g., yesterday's data, last month's data, or data up to the time the job begins running.

Run control 1526, when actuated, can cause transmitting module 276 to transmit the job specification to, e.g., manipulation module 248 to being processing of the job specification. Other UIs herein, e.g., UI 600, can also have a run control 1526.

Figure 16:
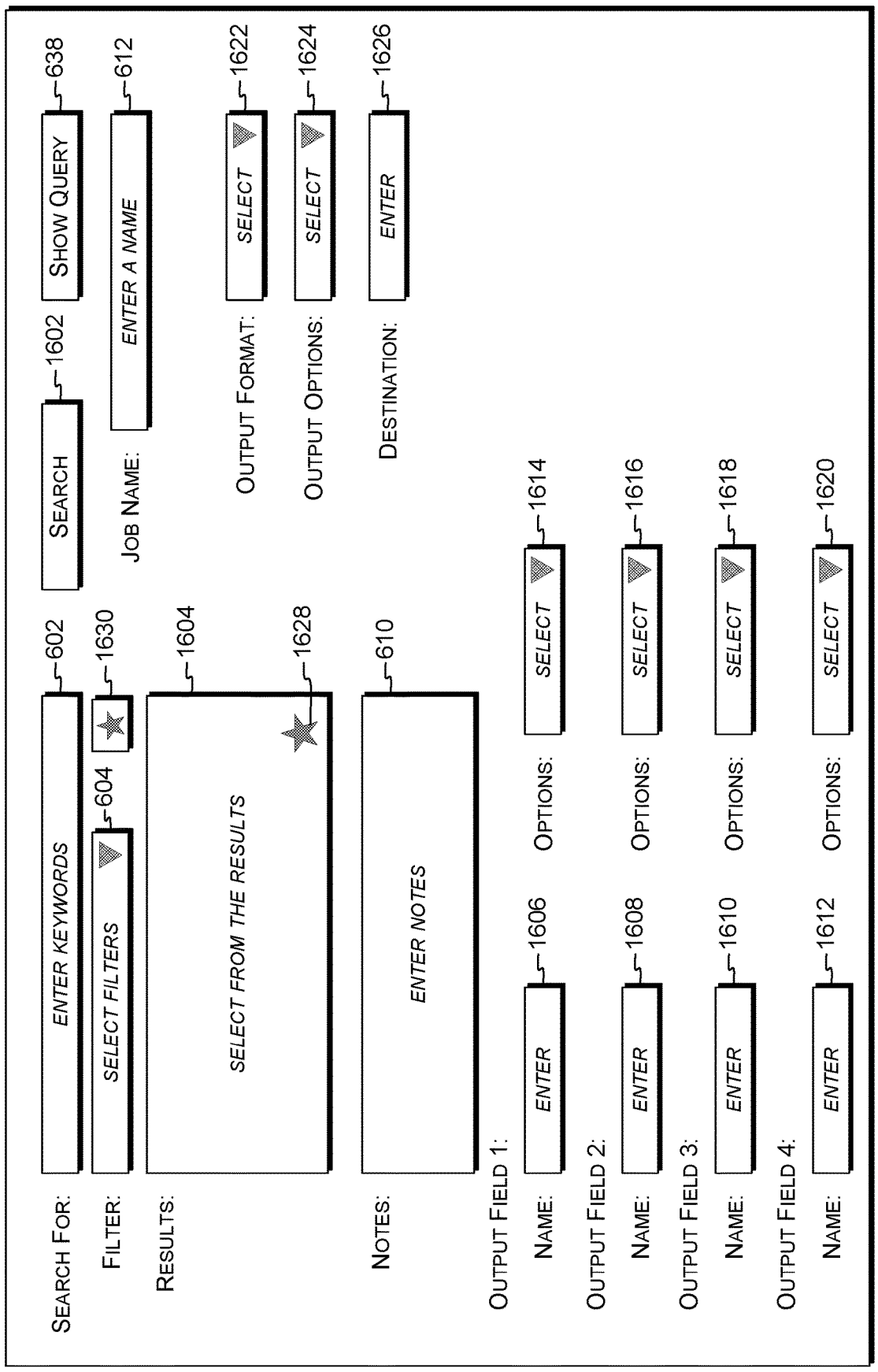
FIG. 16 is a graphical representation of an example reporting or data-export user interface.

FIG. 16 is a graphical representation of an example user interface (UI) 1600 for an export job, e.g., as discussed above with reference to modules of the interaction engine 214 and reporting engine 208. Some controls can be as discussed above with reference to FIG. 6, as indicated by the part numbers. Example UI 1600 can receive indications of any number of fields to export from database 232.

In some example, search control 1602, or an incremental search, can search all data sources, or only the outputs of analysis jobs, or a combination thereof. In some examples, search results control 1604 can receive an indication of an analysis job to export even if that job has not been added to metadata repository 234 as a data source. Other functions of search control 1602 are discussed above with reference to search control 606, and of search results control 1606 with reference to search results control 608.

Output-field controls of the illustrated UI 1600 can include field-name controls 1606, 1608, 1610, and 1612 that receive the names of fields to be placed into the data source. Although shown as entry controls, at least some of the controls 1606-1612 can be selection controls, e.g., to select from names used by the data source or job providing the data records. Output-field controls in this example also include options controls 1614, 1616, 1618, and 1620 for receiving options to be applied to the fields named in controls 1606-1612, respectively. The options can include processing options to be applied to the field before export, e.g., any of the options described above with reference to options controls 1510-1516. The options can additionally or alternatively include options specific to a particular output format, e.g., a designation of one or more fields as primary keys for SQL export, a designation of one or more fields to be indexed in the output, or a collation sequence or maximum length for text fields such as SQL VARCHAR fields.

Illustrated UI 1600 can include output-format control 1622, e.g., a selection or entry control, receiving a selection of an output format such as SQL, CSV, or other formats described above. Output-options control 1624 can receive options applicable to the output as a whole, e.g., delimiter (such as comma, tab, or pipe), line ending (e.g., carriage return, line feed, or both), text file encoding, or compression. Destination control 1626 can receive an indication of a location to store the output data, e.g., a database connection string, uniform resource locator (URL), filename or path, uniform naming convention (UNC) path, email address, postal address, or other destination identifier.

Illustrated UI 1600 can include an add-favorite control 1628, illustrated as a star shown in search results control 1604. Add-favorite control 1628, when operated, can add selected data source(s) in search results control 1604 to a "favorite" list of entity 304 or other user of illustrated UI 1600. Illustrated UI 1600 can include show-favorite control 1630, e.g., a pushbutton or drop-down. Show-favorite control 1630, when operated, can present a list of favorites of entity 304, e.g., designated as such using add-favorite control 1628. For example, when show-favorite control 1630 is operated, the favorites can be displayed in search results control 1604. Permitting entities or other users to designate and retrieve favorites can permit entities or other users to readily select from, e.g., frequently-used data sources.

EXAMPLE CLAUSES

A: A system comprising: at least one computer-readable media having thereon a plurality of modules; and at least one processing unit operably coupled to one(s) of the computer-readable media, configured to access data from data source(s), and adapted to execute modules of the plurality of modules comprising: at least one module of a construction engine configured to: determine a data manipulation based at least in part on a job specification, wherein at least one of the data source(s) is associated with the job specification; determine a data-processing instruction based at least in part on the data manipulation and at least some metadata of the at least one of the data source(s); and determine a query from the data-processing instruction based at least in part on the job specification; and at least one module of an execution engine configured to: execute the query by accessing data from at least one of the data source(s) based at least in part on the query to provide query results.

B: A system as paragraph A recites, wherein the construction engine is further configured to: determine a plurality of data manipulations, the plurality of data manipulations including the data manipulation; determine a plurality of data-processing instructions based at least in part on respective data manipulations of the plurality of data manipulations, the plurality of data-processing instructions including the data-processing instruction; determine a relative order of at least two of the data manipulations of the plurality of data manipulations, wherein at least two of the data-processing instructions correspond to the at least two of the data manipulations, respectively; and determine the query further by assembling at least two of the data-processing instructions according to the determined relative order.

C: A system as paragraph A or B recites, wherein the construction engine is further configured to determine the data-processing instruction by: retrieving a stored template corresponding to the data manipulation; and populating at least one field in the stored template based at least in part on the at least some metadata of the at least one of the data source(s) to provide the at least one of the data-processing instructions.

D: A system as any of paragraphs A-C recites, the plurality of modules further comprising at least one module of an ingestion engine configured to: retrieve a data records; determine metadata corresponding to the data record, the metadata including a data-source identifier indicating at least one of the data source(s); and store the metadata in a metadata repository in association with the data-source identifier.

E: A system as paragraph D recites, wherein the ingestion engine is configured to determine the metadata by extracting attribute values or relationships from the data.

F: A system as any of paragraphs A-E recites, the plurality of modules further comprising one or more modules of a reporting engine configured to: determine an output format based at least in part on the job specification; determine a second data-processing instruction to perform at least one of a copy, a move, or a transformation of the query results according to the output format; and execute the second data-processing instruction to provide reported data corresponding to the query results based at least in part on the output format.

G: A system as any of paragraphs A-F recites, wherein the reporting engine is further configured to produce a notification indicating the reported data have been provided.

H: A system as any of paragraphs A-G recites, the plurality of modules further comprising at least one module configured to: provide a user interface comprising a data-source selection control, a query-criterion control, and a result-field control; and receive the job specification via the user interface.

I: A system as any of paragraphs A-H recites, wherein the execution module is configured to execute the query multiple times according to information in the job specification.

J: A system as any of paragraphs A-I recites, wherein the execution module is configured to execute the query multiple times on a schedule indicated in the job specification.

K: A system as any of paragraphs A-J recites, wherein the job specification includes timeliness information and at least one of the construction engine or the execution engine is configured to filter data from at least one of the data sources based at least in part on the timeliness information.

L: A computer-implemented method, comprising: receiving a search request comprising one or more search keys and indicating a plurality of data sources; determining a weight of a first data source of the plurality of data sources based at least in part on producer-consumer relationships between at least two data sources of the plurality of the data sources; searching metadata associated with at least one data source of the plurality of data sources using the search keys to identify matching data sources of the plurality of data sources, wherein the matching data sources correspond to the search request; determining ranking information of at least the first data source and a second data source of the plurality of the data sources based at least in part on the determined weight; and transmitting identification information of the matching data sources and the ranking information.

M: A computer-implemented method as paragraph L recites, wherein the determining the weight comprises: determining, based at least in part on the metadata of the data sources, a number of consumers of the first data source; and determining the weight for the first data source based at least in part on the number of consumers, wherein the determined respective weight is positively correlated with the number of consumers.

N: A computer-implemented method as paragraph L or M recites, wherein the searching further comprises: filtering the metadata based at least in part on at least a type of data source to identify candidate data sources of the plurality of data sources; and selecting the matching data sources from the candidate data sources based at least in part on at least some of the search keys.

O: A computer-implemented method as any of paragraphs L-N recites, further comprising: grouping at least some of the matching data sources based at least in part on at least types or sources of the at least some of the matching data sources to provide grouping information; and transmitting the grouping information in association with the identification information and the ranking information.

P: A computer-readable medium having thereon computer-executable instructions, the computer-executable instructions upon execution configuring a computer to perform operations comprising: receive a data record from a data stream; determine structural information of the data record and content information of the data record; determine a data-source identifier based at least in part on the structural information; and store the content information into a database in association with the data-source identifier.

Q: A computer-readable medium as paragraph P recites, the operations to determine the data-source identifier comprising: determining whether the structural information is represented in a metadata repository; in response to the structural information missing from the metadata repository, adding the structural information to the metadata repository; and receiving the data-source identifier corresponding to the structural information from the metadata repository.

R: A computer-readable medium as paragraph P or Q recites, the operations to determine the data-source identifier comprising querying a metadata repository for the data-source identifier corresponding to the structural information.

S: A computer-readable medium as any of paragraphs P-R recites, the operations to receive the data record comprising requesting the data record from the data stream.

T: A computer-readable medium as any of paragraphs P-S recites, the operations to receive the data record comprising: establishing a network connection with the data stream; and receiving the data record via the network connection.

U: A computer-readable medium as any of paragraphs P-T recites, the operations to determine the structural information comprising: parsing the received data record to locate a field name and a field relationship in the received data record; and assembling the field name and the field relationship to provide the structural information.

V: A computer-readable medium as any of paragraphs P-U recites, the operations further comprising: receiving a plurality of data records from the data stream, the plurality of records including the data record; determining respective structural information records for individual data records of the plurality of data records, the respective structural information record for the data record including the structural information; determining a representative structural information record of the respective structural information records, the representative structural information record associated with a respective data-source identifier and corresponding to one or more of the individual data records; and storing at least one of the individual data records into the database in association with the data-source identifier of the representative structural information record.

W: A computer-readable medium as any of paragraphs P-V recites, the operations further comprising: determining a data manipulation based at least in part on a job specification, wherein a data source identified by the data-source identifier is associated with the job specification; determining a data-processing instruction based at least in part on the data manipulation and at least some metadata of the data source; determining a query from the data-processing instruction based at least in part on the job specification; and executing the query by accessing data from the data source based at least in part on the query to provide query results.

X: A computer-readable medium as any of paragraphs P-W recites, the operations further comprising: receiving a search request comprising one or more search keys and indicating a plurality of data sources, wherein the plurality of data sources includes a first data source identified by the data-source identifier; determining a weight of the first data source based at least in part on producer-consumer relationships between at least two data sources of the plurality of the data sources; searching metadata associated with at least one data source of the plurality of data sources using the search keys to identify matching data sources of the plurality of data sources, wherein the matching data sources correspond to the search request; determining ranking information of at least the first data source and a second data source of the plurality of the data sources based at least in part on the determined weight; and transmitting identification information of the matching data sources and the ranking information.

Y: A computer-implemented method, comprising: presenting a user interface comprising at least one query-criterion control and at least one result-field control; receiving, via the user interface, information of a job specification, the job specification including a query criterion and a result-field specification; presenting, in the user interface, an annotation control; receiving, via the user interface, annotation data; and storing, in a metadata repository, the information of the job specification in association with the annotation data.

Z: A computer-implemented method as paragraph Y recites, further comprising: presenting, in the user interface, a data-source search control; receiving, via the user interface, a search key; searching the metadata repository for data sources matching the search key to provide matching data sources, wherein the searching includes at least searching stored annotation data; and presenting, in the user interface, identification information of the matching data sources.

AA: A computer-implemented method as paragraph Z recites, wherein the matching data sources include the job specification, the method further comprising, after presenting the identification information, receiving, via the user interface, a second job specification including a designation of the job specification as a data source.

AB: A computer-implemented method as paragraph Z or AA recites, further comprising: determining a weight of a data source of the data sources based at least in part on producer-consumer relationships between at least two data sources of the data sources; determining ranking information of at least two of the matching data sources based at least in part on the determined weight; and presenting, in the user interface, the ranking information of the at least two of the matching data sources.

AC: A system, comprising: means for receiving a search request comprising one or more search keys and indicating a plurality of data sources; means for determining a weight of a first data source of the plurality of data sources based at least in part on producer-consumer relationships between at least two data sources of the plurality of the data sources; means for searching metadata associated with at least one data source of the plurality of data sources using the search keys to identify matching data sources of the plurality of data sources, wherein the matching data sources correspond to the search request; means for determining ranking information of at least the first data source and a second data source of the plurality of the data sources based at least in part on the determined weight; and means for transmitting identification information of the matching data sources and the ranking information.

AD: A system as paragraph AC recites, wherein the means for determining the weight comprises: means for determining, based at least in part on the metadata of the data sources, a number of consumers of the first data source; and means for determining the weight for the first data source based at least in part on the number of consumers, wherein the determined respective weight is positively correlated with the number of consumers.

AE: A system as paragraph AC or AD recites, wherein the means for searching further comprises: means for filtering the metadata based at least in part on at least a type of data source to identify candidate data sources of the plurality of data sources; and means for selecting the matching data sources from the candidate data sources based at least in part on at least some of the search keys.

AF: A system as any of paragraphs AC-AE recites, further comprising: means for grouping at least some of the matching data sources based at least in part on at least types or sources of the at least some of the matching data sources to provide grouping information; and means for transmitting the grouping information in association with the identification information and the ranking information.

AG: A system, comprising: means for presenting a user interface comprising at least one query-criterion control and at least one result-field control; means for receiving, via the user interface, information of a job specification, the job specification including a query criterion and a result-field specification; means for presenting, in the user interface, an annotation control; means for receiving, via the user interface, annotation data; and means for storing, in a metadata repository, the information of the job specification in association with the annotation data.

AH: A system as paragraph AG recites, further comprising: means for presenting, in the user interface, a data-source search control; means for receiving, via the user interface, a search key; means for searching the metadata repository for data sources matching the search key to provide matching data sources, wherein the searching includes at least searching stored annotation data; and means for presenting, in the user interface, identification information of the matching data sources.

AI: A system as paragraph AH recites, wherein the matching data sources include the job specification, the system further comprising means for, after presenting the identification information, receiving, via the user interface, a second job specification including a designation of the job specification as a data source.

AJ: A system as paragraph AH or AI recites, further comprising: means for determining a weight of a data source of the data sources based at least in part on producer-consumer relationships between at least two data sources of the data sources; means for determining ranking information of at least two of the matching data sources based at least in part on the determined weight; and means for presenting, in the user interface, the ranking information of the at least two of the matching data sources.

AK: A computer-readable medium, e.g., a computer storage medium, having thereon computer-executable instructions, the computer-executable instructions upon execution configuring a computer to perform operations as any of paragraphs L-O recites.

AL: A device comprising: a processor; and a computer-readable medium, e.g., a computer storage medium, having thereon computer-executable instructions, the computer-executable instructions upon execution by the processor configuring the device to perform operations as any of paragraphs L-O recites.

AM: A system comprising: means for processing; and means for storing having thereon computer-executable instructions, the computer-executable instructions including means to configure the system to carry out a method as any of paragraphs L-O recites.

AN: A computer-implemented method, comprising performing operations as any of paragraphs P-X recites.

AO: A device comprising: a processor; and a computer-readable medium as any of paragraphs L-O recites, wherein the processor is configured to execute computer-executable instructions on the computer-readable medium.

AP: A computer-readable medium, e.g., a computer storage medium, having thereon computer-executable instructions, the computer-executable instructions upon execution configuring a computer to perform operations as any of paragraphs Y-AB recites.

AQ: A device comprising: a processor; and a computer-readable medium, e.g., a computer storage medium, having thereon computer-executable instructions, the computer-executable instructions upon execution by the processor configuring the device to perform operations as any of paragraphs Y-AB recites.

AR: A system comprising: means for processing; and means for storing having thereon computer-executable instructions, the computer-executable instructions including means to configure the system to carry out a method as any of paragraphs Y-AB recites.

CONCLUSION

Various database operation techniques described herein can permit more efficiently storing data in databases, specifying or executing queries, or reporting results of queries. Various aspects can provide reduced computational and user burden to locate data sources for records of interest. Various aspects can efficiently apply best practices for query construction even when users do not know those practices.

Various examples can provide data directly to users' database clients, reducing temporary-storage requirements of the database system.

Although the techniques have been described in language specific to structural features or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, or 200 such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc., can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternative implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system comprising:
   computer-readable media having thereon a plurality of modules; and
   at least one processing unit operably coupled with the computer-readable media, configured to access data from one or more data sources, and adapted to execute one or more modules of the plurality of modules comprising:
      at least one module of a construction engine configured to:
         determine a dataflow corresponding to a job specification associated with one or more data sources;
         determine a data manipulation to operate on the job specification based on the dataflow;
         determine a data-processing instruction to perform functions of the data manipulation based on the data manipulation and at least some metadata of the one or more data sources; and
         determine a query by assembling the data-processing instruction based at least in part on the job specification;
      at least one module of an execution engine configured to:
         execute the query by accessing the data from at least one of the one or more data sources to provide query results; and
      at least one module of an ingestion engine configured to:
         retrieve a data record;
         determine metadata corresponding to the data record by extracting attribute values or relationships from the data, the metadata including a data-source identifier indicating at least one of the one or more data sources; and
         store the metadata in a metadata repository in association with the data-source identifier.

2. The system as claim 1 recites, wherein the construction engine is further configured to:
   determine a plurality of data manipulations, the plurality of data manipulations including the data manipulation;
   determine a plurality of data-processing instructions based at least in part on respective data manipulations of the plurality of data manipulations, the plurality of data-processing instructions including the data-processing instruction;
   determine a relative order of at least two data manipulations of the plurality of data manipulations, wherein at least two data-processing instructions correspond to the at least two data manipulations, respectively; and
   determine the query further by assembling the at least two data-processing instructions according to the relative order.

3. The system as claim 1 recites, wherein the construction engine is further configured to determine the data-processing instruction by:
   retrieving a stored template corresponding to the data manipulation; and
   populating at least one field in the stored template based at least in part on the at least some metadata of the one or more data sources to provide the data-processing instruction.

4. The system as claim 1 recites, the plurality of modules further comprising one or more modules of a reporting engine configured to:
   determine an output format based at least in part on the job specification;
   determine a second data-processing instruction to perform at least one of a copy, a move, or a transformation of the query results according to the output format; and
   execute the second data-processing instruction to provide reported data corresponding to the query results based at least in part on the output format.

5. The system as claim 1 recites, the plurality of modules further comprising at least one module configured to:
   provide a user interface comprising a data-source selection control, a query-criterion control, and a result-field control; and
   receive the job specification via the user interface.

6. A computer-implemented method, comprising:
   determining a dataflow corresponding to a job specification associated with one or more data sources;
   determining a data manipulation to operate on the job specification based on the dataflow;
   determining a data-processing instruction to perform functions of the data manipulation based on the data manipulation and at least some metadata of the one or more data sources; and
   determining a query by assembling the data-processing instruction based at least in part on the job specification;
   executing the query by accessing data from at least one of the one or more data sources to provide query results; and
   retrieving a data record;
   determining metadata corresponding to the data record by extracting attribute values or relationships from the data, the metadata including a data-source identifier indicating at least one of the one or more data sources; and
   storing the metadata in a metadata repository in association with the data-source identifier.

7. The computer-implemented method of claim 6, further comprising:
   determining a plurality of data manipulations, the plurality of data manipulations including the data manipulation;
   determining a plurality of data-processing instructions based at least in part on respective data manipulations of the plurality of data manipulations, the plurality of data-processing instructions including the data-processing instruction;
   determining a relative order of at least two data manipulations of the plurality of data manipulations, wherein at least two data-processing instructions correspond to the at least two data manipulations, respectively; and
   determining the query further by assembling the at least two data-processing instructions according to the relative order.

8. The computer-implemented method of claim 6, wherein the determining the data-processing instruction comprises:
   retrieving a stored template corresponding to the data manipulation; and
   populating at least one field in the stored template based at least in part on the at least some metadata of the one or more data sources to provide the data-processing instruction.

9. The computer-implemented method of claim 6, further comprising:
   determining an output format based at least in part on the job specification;
   determining a second data-processing instruction to perform at least one of a copy, a move, or a transformation of the query results according to the output format; and
   executing the second data-processing instruction to provide reported data corresponding to the query results based at least in part on the output format.

10. The computer-implemented method of claim 6, further comprising:
    providing a user interface comprising a data-source selection control, a query-criterion control, and a result-field control; and
    receiving the job specification via the user interface.

11. A non-transitory computer-readable medium comprising instructions executable by a processor, comprising:
    instructions to determine a dataflow corresponding to a job specification associated with one or more data sources;
    instructions to determine a data manipulation to operate on the job specification based on the dataflow;
    instructions to determine a data-processing instruction to perform functions of the data manipulation based on the data manipulation and at least some metadata of the one or more data sources; and
    instructions to determine a query by assembling the data-processing instruction based at least in part on the job specification;
    instructions to execute the query by accessing data from at least one of the one or more data sources to provide query results; and
    instructions to retrieve a data record;
    instructions to determine metadata corresponding to the data record by extracting attribute values or relationships from the data, the metadata including a data-source identifier indicating at least one of the one or more data sources; and
    instructions to store the metadata in a metadata repository in association with the data-source identifier.

12. The non-transitory computer-readable medium of claim 11, further comprising:
    instructions to determine a plurality of data manipulations, the plurality of data manipulations including the data manipulation;
    instructions to determine a plurality of data-processing instructions based at least in part on respective data manipulations of the plurality of data manipulations, the plurality of data-processing instructions including the data-processing instruction;
    instructions to determine a relative order of at least two data manipulations of the plurality of data manipulations, wherein at least two data-processing instructions correspond to the at least two data manipulations, respectively; and
    instructions to determine the query further by assembling the at least two data-processing instructions according to the relative order.

13. The non-transitory computer-readable medium of claim 11, further comprising:
    instructions to retrieve a stored template corresponding to the data manipulation; and
    instructions to populate at least one field in the stored template based at least in part on the at least some metadata of the one or more data sources to provide the data-processing instruction.

14. The non-transitory computer-readable medium of claim 11, further comprising:
- instructions to determine an output format based at least in part on the job specification;
- instructions to determine a second data-processing instruction to perform at least one of a copy, a move, or a transformation of the query results according to the output format; and
- instructions to execute the second data-processing instruction to provide reported data corresponding to the query results based at least in part on the output format.

15. The non-transitory computer-readable medium of claim 11, further comprising:
- instructions to provide a user interface comprising a data-source selection control, a query-criterion control, and a result-field control; and
- instructions to receive the job specification via the user interface.

* * * * *